US009984492B2

(12) United States Patent
Obert

(10) Patent No.: US 9,984,492 B2
(45) Date of Patent: May 29, 2018

(54) EFFICIENT HIERARCHY TRAVERSAL IN RAY TRACING APPLICATIONS

(71) Applicant: QUALCOMM Incorporated, San Diego, CA (US)

(72) Inventor: Juraj Obert, Orlando, FL (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 14/831,726

(22) Filed: Aug. 20, 2015

(65) Prior Publication Data

US 2016/0292908 A1 Oct. 6, 2016

Related U.S. Application Data

(60) Provisional application No. 62/142,347, filed on Apr. 2, 2015.

(51) Int. Cl.
| | |
|---|---|
| *G06T 15/06* | (2011.01) |
| *G06T 1/20* | (2006.01) |
| *G06T 15/00* | (2011.01) |
| *G06T 15/08* | (2011.01) |
| *G06T 17/00* | (2006.01) |

(52) U.S. Cl.
CPC ............... *G06T 15/06* (2013.01); *G06T 1/20* (2013.01); *G06T 15/005* (2013.01); *G06T 15/08* (2013.01); *G06T 17/005* (2013.01)

(58) Field of Classification Search
CPC ......... G06T 15/06; G06T 1/20; G06T 15/005; G06T 15/08; G06T 17/005
See application file for complete search history.

(56) References Cited

U.S. PATENT DOCUMENTS

| | | | |
|---|---|---|---|
| 2008/0074417 A1* | 3/2008 | Mejdrich ................ | G06T 15/06 345/420 |
| 2009/0106530 A1* | 4/2009 | Lauterbach ....... | G06F 17/30961 712/30 |
| 2009/0167763 A1* | 7/2009 | Waechter ................ | G06T 15/06 345/426 |
| 2009/0256845 A1 | 10/2009 | Sevastianov et al. | |

(Continued)

OTHER PUBLICATIONS

Barczak J., "An Improved Multi-Level Raytracing Algorithm," 2009, 6 pages.

(Continued)

*Primary Examiner* — Abderrahim Merouan
(74) *Attorney, Agent, or Firm* — Knobbe, Martens, Olson & Bear, LLP

(57) ABSTRACT

Methods and systems disclosed improve the efficiency of ray tracing. In one aspect, a method of ray tracing in a digital representation of a scene includes segmenting the scene into a plurality of voxels, associating each of the voxels with a node of a bounding volume hierarchy (BVH) representing one or more object primitives within the scene, determining a set of voxels through which the ray passes, determining a set of nodes associated with the set of voxels, determining a deepest common ancestor node of the set of nodes, traversing the hierarchy starting at the deepest common ancestor node to determine a point of intersection between the ray and one of the one or more object primitives; and updating a digital image of the scene based on the determined point of intersection.

30 Claims, 13 Drawing Sheets

(56) References Cited

U.S. PATENT DOCUMENTS

| | | |
|---|---|---|
| 2010/0053162 A1 | 3/2010 | Dammertz et al. |
| 2010/0239186 A1 | 9/2010 | Fowler et al. |
| 2012/0299914 A1* | 11/2012 | Kilpatrick ............... G06T 15/50 345/420 |
| 2012/0320073 A1* | 12/2012 | Mason .................. G06F 3/1431 345/581 |
| 2013/0016109 A1 | 1/2013 | Garanzha |
| 2013/0235049 A1 | 9/2013 | Karras |

OTHER PUBLICATIONS

Fowler C., et al., "Accelerated Entry Point Search Algorithm for Real-Time Ray-Tracing", Proceedings-SCCG 2009: 25th Spring Conference on Computer Graphics-Proceedings-SCCG 2009: 25th Spring Conference on Computer Graphics 2009 Association for Computing Machinery USA, 2009, pp. 59-66, DOI : 10.1145/1980462.1980476.
International Search Report and Written Opinion—PCT/US2016/022566—ISA/EPO—dated Jun. 29, 2016.
Muller G., et al., "Hybrid Scene Structuring with Application to RayTracing I Technical Report TUBS-CG-1999-05", Institute of Computer Graphics, TU BraunschweigRebenring 18, D-38106 Braunschweig, Germany, 9 Pages, 1999, Retrieved from the Internet: URL: http://www.cgv.tugraz.at/CGV/Digitallibrary/publications/Technical Reports/bs/TR-tubs-cg-1999-05.pdf.
Reshetov A., et al., "Multi-Level Ray Tracing Algorithm", ACM Transactions on Graphics (TOG), ACM, US, vol. 24, No. 3, Jul. 1, 2005 (Jul. 1, 2005), pp. 1176-1185, XP002466403, ISSN: 0730-0301, DOI: 10.1145/1073204.1073329.

* cited by examiner

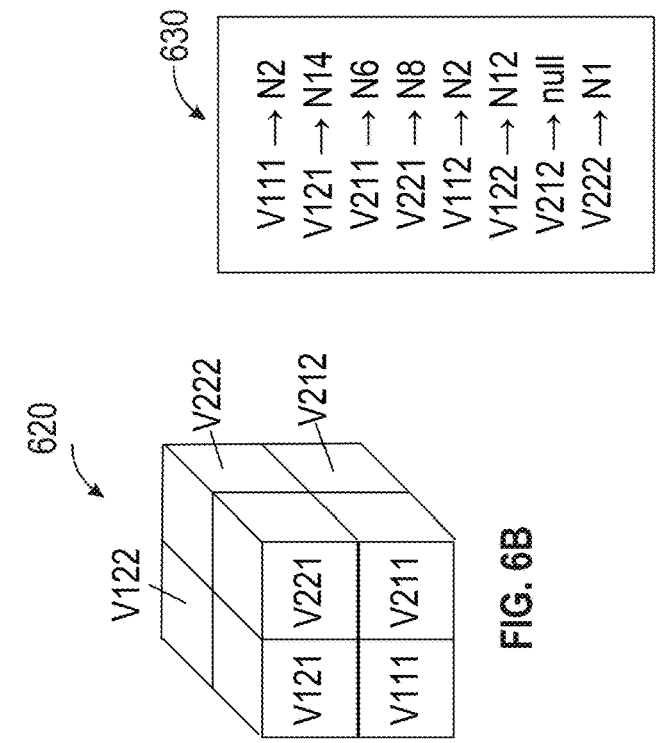
FIG. 6C
FIG. 6B
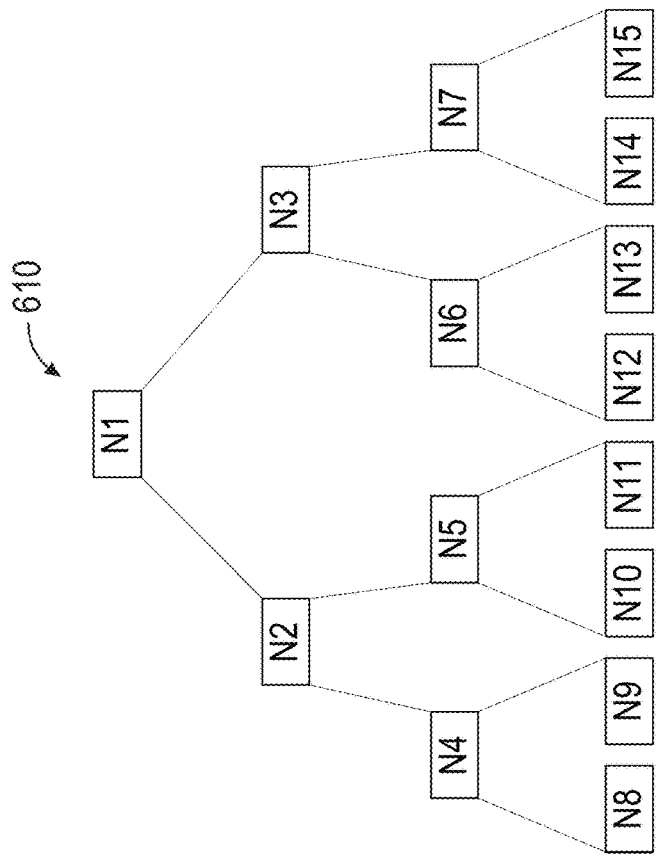
FIG. 6A

Algorithm 2 BVH voxelization algorithm

```
 1:    procedure VOXELIZENODES(bvhNode, depth)
 2:        if ((depth = 0) OR (bvhNode.numTriangles ≠ 0)) then
 3:            VoxelizeNodeOnCPU(bvhNode, bvhNode.nodeID)
 4:        else
 5:            VoxelizeNodes(bvhNode.lChild, depth - 1)
 6:            VoxelizeNodes(bvhNode.rChild, depth - 1)
 7:        end if
 8:    end procedure
 9:
10:    procedure VOXELIZEBVH(rootNode, depth)
11:        //First pass—we voxelize all nodes at given tree depth
12:        VoxelizeNodes(rootNode, depth, OP_Draw)
13:
14:         //Second pass
15:        for pass ← depth - 1; pass ≥ 0; pass ← pass - 1 do
16:            for each node in rootNode.nodesAtLevel(pass) do
17:                if node.numTriangles = 0 then
18:                    ClearCPUStencilBitsToZero()
19:
20:                    SetCPUStencilOp(OP_SET_ONE)
21:                    VoxelizeNodes(node.lChild, depth - pass - 1)
22:
23:                    SetCPUStencilOp(OP_SET_TWO_IF_ONE_SET)
24:                    VoxelizeNodes(node.rChild, depth - pass - 1)
25:
26:                    SetCPUStencilOp(OP_DRAW_IF_TWO_SET)
27:                    VoxelizeNodes(node.lChild, depth - pass - 1)
28:                end if
29:            end for
30:        end for
31:    end procedure
```

FIG. 10

Algorithm 3 Lowest Common Ancestor

```
1:      function LCA (uint first, uint second)
2:          if first > second then
3:              swap(first, second)
4:          end if
5:
6:          if first = 1 then
7:              return 1
8:          end if
9:
10:         highestBit ← getHighestSetBit(first)
11:         mask ← createBitMask(MSB, highestBit)
12:
13:         while first & mask ≠ second & mask do
14:             second ← second >> 1
15:         end while
16:
17:         while first ≠ second do
18:             first ← first >> 1
19:             second ← second >> 1
20:         end while
21:
22:         return first
23:     end function
```

FIG. 11

FIG. 15

| | Teapot shadows $16^3$ | Head reflection $16^3$ | Fruit Bowl AO $16^3$ | Fruit Bowl AO $32^3$ | Sponza AO $16^3$ | Sponza AO $32^3$ | Spheres refraction $16^3$ | Spheres refraction $32^3$ |
|---|---|---|---|---|---|---|---|---|
| | Ray/AABB intersection count (millions) and relative reduction for secondary rays | | | | | | | |
| Baseline | 6.0 | 2.8 | 397 | 397 | 669 | 669 | 6.6 | 6.6 |
| Depth = 1 | 5.8 (3.1%) | 2.6 (8.9%) | 384 (3.4%) | 382 (4.0%) | 637 (4.9%) | 637 (4.9%) | 6.1 (7.3%) | 6.1 (8.1%) |
| Depth = 2 | 5.7 (4.1%) | 2.4 (15.3%) | 377 (5.2%) | 372 (6.4%) | 608 (9.1%) | 608 (9.1%) | 6.1 (8.2%) | 6.0 (9.0%) |
| Depth = 6 | 5.2 (13.7%) | 2.0 (27.3%) | 364 (8.3%) | 345 (13.3%) | 552 (17.6%) | 537 (19.8%) | 6.0 (8.6%) | 5.9 (10.2%) |
| Depth = 10 | 5.0 (16.1%) | 1.8 (36.7%) | 353 (11.2%) | 321 (19.1%) | 507 (24.3%) | 390 (41.6%) | 6.0 (8.7%) | 5.9 (10.5%) |
| Depth = 15 | 5.0 (16.1%) | 1.7 (38.9%) | 350 (12.0%) | 314 (21.0%) | 493 (26.3%) | 347 (48.1%) | 6.0 (8.7%) | 5.9 (10.5%) |
| | BVH voxelization time (ms) and proportion of BVH build time | | | | | | | |
| Depth = 1 | 0.03 (0.2%) | 0.03 (0.0%) | 0.05 (0.0%) | 0.75 (0.0%) | 0.06 (0.0%) | 0.82 (0.0%) | 0.02 (0.1%) | 0.3 (1.9%) |
| Depth = 2 | 0.06 (0.4%) | 0.05 (0.0%) | 0.09 (0.0%) | 1.54 (0.0%) | 0.17 (0.0%) | 1.15 (0.1%) | 0.02 (0.1%) | 0.3 (2.5%) |
| Depth = 6 | 0.25 (1.6%) | 0.28 (0.1%) | 0.34 (0.0%) | 2.76 (0.1%) | 0.79 (0.0%) | 4.90 (0.4%) | 0.07 (0.4%) | 0.5 (3.4%) |
| Depth = 10 | 1.05 (6.6%) | 2.01 (0.9%) | 2.69 (0.1%) | 6.20 (0.3%) | 2.55 (0.2%) | 8.33 (0.8%) | 0.58 (3.8%) | 1.15 (7.5%) |
| Depth = 15 | 1.25 (7.8%) | 8.93 (4.2%) | 35.67 (1.7%) | 43.90 (2.1%) | 23.85 (2.3%) | 35.84 (3.5%) | 0.76 (4.9%) | 1.26 (8.1%) |

FIG. 16

EFFICIENT HIERARCHY TRAVERSAL IN RAY TRACING APPLICATIONS

CROSS-REFERENCE TO RELATED APPLICATIONS

This application claims priority to U.S. Provisional Patent Application No. 62/142,347, filed on Apr. 2, 2015. The content of this prior application is considered part of this application, and is hereby incorporated by reference in its entirety.

BACKGROUND

Field

The disclosed technology relates to graphics processing, including traversing a hierarchical structure to determine ray-object intersections for ray tracing.

Description of the Related Technology

Ray tracing is a computer graphics technique to generate images by tracing paths of light through a three dimensional scene, simulating interactions with objects illuminated by light sources, and finding ray-primitive, or ray-object intersections. Ray tracing may generate realistic images, including shadows. In order to accelerate the process of ray tracing, scene geometry may be stored in an acceleration data structure, or hierarchy, that groups scene primitives. Examples of acceleration data structures (hierarchies) in use include bounding volume hierarchy (BVH) trees, KD-trees, and grids. Ray tracing methods traverse these hierarchies to determine ray-object intersections.

SUMMARY

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages to traversing hierarchies for ray tracing.

One innovation is a method of tracing a ray in an electronic image of a scene. In various embodiments the method may include segmenting the scene into a plurality of voxels. The method may further include associating each of the voxels with a node of a bounding volume hierarchy (BVH) representing one or more object primitives within the scene. The method may further include determining a set of voxels through which the ray passes. The method may further include determining a set of nodes associated with the set of voxels. The method may further include determining a deepest common ancestor node of the set of nodes. The method may further include traversing the hierarchy starting at the deepest common ancestor node to determine a point of intersection between the ray and one of the one or more object primitives. The method may further include updating a digital image of the scene based on the determined point of intersection.

For some implementations the method further includes outputting the updated digital image to an output device.

For some implementations, associating each voxel with a node includes determining a smallest set of bounding volumes for each voxel encompassing all primitives also included in the space represented by the voxel. For some implementations, associating each voxel with a node includes determining nodes in the hierarchy associated with the set of bounding volumes. For some implementations, associating each voxel with a node includes determining a second deepest common ancestor of the determined nodes. For some implementations, associating each voxel with a node includes associating the voxel with the second deepest common ancestor.

For some implementations, traversing the hierarchy includes performing a depth first traversal of the hierarchy starting with the deepest common ancestor.

For some implementations the method further includes selecting the smallest set of bounding volumes from bounding volumes at a level of the bounding volume hierarchy below a threshold.

For some implementations the method further includes storing an identification of each voxel and its associated node in a data structure For some implementations the method further includes determining a plurality of deepest common ancestors for a corresponding plurality of rays based on the data structure.

For some implementations, the ray is a shadow ray following a path from a surface point toward a light source in the scene, the surface point on one of the one or more object primitives. For some implementations, the surface point corresponds to the point of intersection of a second ray, the path of the shadow ray independent of an origin of the second ray.

Another innovation is an apparatus configured to trace a ray in an electronic image of a scene. The apparatus may include a memory circuit configured to store a representation of a scene. The apparatus may include a processor circuit in communication with the memory unit. The processor circuit may be configured to segment the scene into a plurality of voxels. The processor circuit may be configured to associate each of the voxels with a node of a bounding volume hierarchy (BVH) representing one or more object primitives within the scene. The processor circuit may be configured to determine a set of voxels through which the ray passes. The processor circuit may be configured to determine a set of nodes associated with the set of voxels. The processor circuit may be configured to determine a deepest common ancestor node of the set of nodes. The processor circuit may be configured to traverse the hierarchy starting at the deepest common ancestor node to determine a point of intersection between the ray and one of the one or more object primitives. The processor circuit may be configured to update a digital image of the scene based on the determined point of intersection.

For some implementations, the processor circuit is further configured to output the updated digital image to an output device. For some implementations, the processor circuit is further configured to select the smallest set of bounding volumes from bounding volumes at a level of the bounding volume hierarchy below a threshold. For some implementations, the processor circuit is further configured to store an identification of each voxel and its associated node in a data structure. For some implementations, the processor circuit is further configured to determine a plurality of deepest common ancestors for a corresponding plurality of rays based on the data structure.

Another innovation is an apparatus configured to trace a ray in an electronic image of a scene. The apparatus may include means for segmenting the scene into a plurality of voxels. The apparatus may include means for associating each of the voxels with a node of a bounding volume hierarchy (BVH) representing one or more object primitives within the scene. The apparatus may include means for determining a set of voxels through which the ray passes. The apparatus may include means for determining a set of nodes associated with the set of voxels. The apparatus may include means for determining a deepest common ancestor node of the set of nodes. The apparatus may include means for traversing the hierarchy starting at the deepest common ancestor node to determine a point of intersection between the ray and one of the one or more object primitives. The apparatus may include means for updating a digital image of the scene based on the determined point of intersection.

For some implementations, the segmenting means includes a processing circuit. For some implementations, the associating means includes the processing circuit. For some implementations, the set of voxel determining means includes the processing circuit. For some implementations, the set of nodes determining means includes the processing circuit. For some implementations, the deepest common ancestor determining means includes the processing circuit. For some implementations, the hierarchy determining means includes the processing circuit. For some implementations, the traversing means includes the processing circuit. For some implementations, the updating means includes the processing circuit.

For some implementations, the apparatus includes means for outputting the updated digital image to an output device.

For some implementations, the associating means includes means for determining a smallest set of bounding volumes for each voxel encompassing all primitives also included in the space represented by the voxel. For some implementations, the associating means includes means for determining nodes in the hierarchy associated with the set of bounding volumes. For some implementations, the associating means includes means for determining a second deepest common ancestor of the determined nodes. For some implementations, the associating means includes means for associating the voxel with the second deepest common ancestor.

For some implementations, the traversing means includes means for performing a depth first traversal of the hierarchy starting with deepest common ancestor.

For some implementations, the apparatus includes means for selecting the smallest set of bounding volumes from bounding volumes at a level of the bounding volume hierarchy below a threshold. For some implementations, the apparatus includes means for storing an identification of each voxel and its associated node in a data structure For some implementations, the apparatus includes means for determining a plurality of deepest common ancestors for a corresponding plurality of rays based on the data structure.

Another innovation is a non-transitory computer-readable medium storing instructions for tracing a ray, the instructions when executed that, when executed, perform a method. The method may include segmenting the scene into a plurality of voxels. The method may include associating each of the voxels with a node of a bounding volume hierarchy (BVH) representing one or more object primitives within the scene. The method may include determining a set of voxels through which the ray passes. The method may include determining a set of nodes associated with the set of voxels. The method may include determining a deepest common ancestor node of the set of nodes. The method may include traversing the hierarchy starting at the deepest common ancestor node to determine a point of intersection between the ray and one of the one or more object primitives. The method may include updating a digital image of the scene based on the determined point of intersection.

In some implementations, the method may include outputting the updated digital image to an output device.

BRIEF DESCRIPTION OF THE DRAWINGS

FIG. 6A illustrates nodes of a bounding volume hierarchy, such as the hierarchy in FIG. 5.

FIG. 6B illustrates voxels that partition a scene, for example, the scene of FIG. 2.

FIG. 6C shows a mapping between the voxels of FIG. 6A and the nodes of FIG. 6B.

FIG. 10 is an example algorithmic method for BVH voxelization.

FIG. 11 is an example algorithmic method to find a lowest common ancestor.

FIG. 15 illustrates voxelization results for shadow rays, including teapot shadows, head reflections, fruit bowl ambient occlusions (AO), scene from the computer game Sponza ambient occlusions, and sphere reflections.

FIG. 16 shows reductions in ray tracing intersection tests resulting from the disclosed techniques.

DETAILED DESCRIPTION OF CERTAIN EMBODIMENTS

Figure 1:
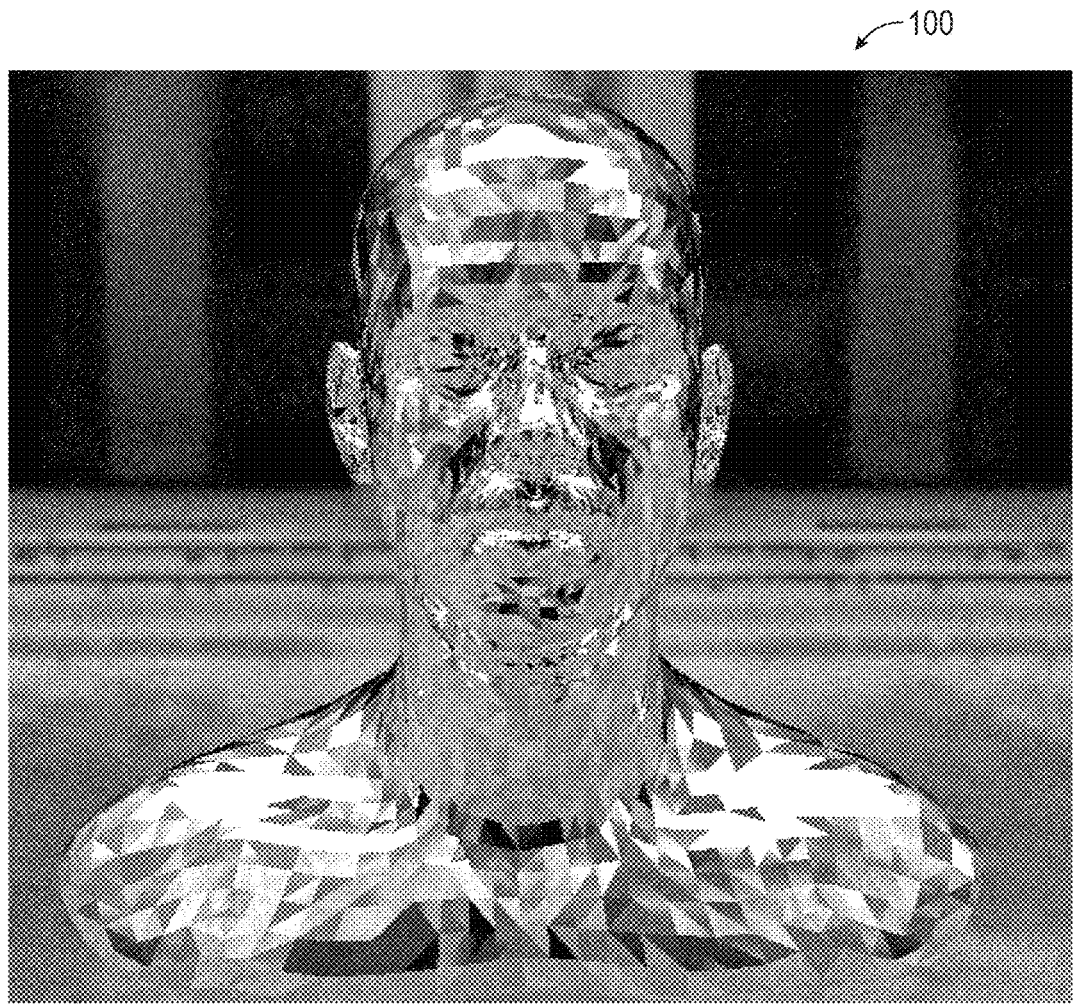
FIG. 1 illustrates a scene containing a head and shoulders that is represented by triangular primitives.

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Ray tracing is a computer graphics technique in which rays (defined by their origins and directions) are traced through sets of scene primitives to identify ray-object intersections. Ray tracers use acceleration data structures (hierarchies) to characterize spatial relationships of objects in scenes. Some implementations use Bounding Volume Hierarchy (BVH) trees, which may be binary trees with a root node at the top of the hierarchy, interior nodes that represent bounded regions of space, and leaf nodes that represent bounded regions of space along with sets of primitives contained in them. In some aspects, a surface area heuristic (SAH) may be used to build the hierarchy. Acceleration data structures may use axis-aligned bounding boxes (AABB) to bound a region. The computational complexity of traversing a BVH tree using AABBs to bound regions, and conduct ray-object intersection tests, is logarithmic with respect to the number of nodes in the tree.

Rendering a single image with ray tracing may require millions of ray/object intersection tests. Substantial reductions in the number of intersection tests may significantly reduce the time it takes to render an image. For example, a 40% decrease in the number of intersection tests may reduce the time to render an image by approximately 40%. Starting the hierarchy traversal process at a non-root node instead of the root node of a hierarchy using the methods, apparatus, and systems disclosed herein may reduce the number of intersection tests by 10%, 30%, 50%, or more, substantially reducing the time it takes to render images.

Acceleration data structure traversal algorithms may be optimized via more efficient tree structures, by exploiting ray coherency, or by organizing nodes into cache-friendly layouts. These approaches may be applied to BVH trees, KD-trees, or other grid or tree structures. Traversal algorithms in existing implementations start at the root node of the tree (or hierarch of the hierarchy), and traverse the entire tree (hierarchy) to cover the entire volume of space of the scene. The methods, apparatus, and systems disclosed herein provide traversal algorithms that may instead traverse only a portion of the tree instead of the entire tree. These methods, apparatus, and systems determine a non-root start node to begin traversing the acceleration data structure.

FIG. 1 illustrates a scene containing a head and shoulders that is represented by triangular primitives. Computer generated imagery (CGI) for applications including video games, film production, virtual reality, training, and augmented reality use ray tracing to render images of scenes containing objects. The objects may be represented in three dimensional space using meshes of primitives, such as triangles, that approximate object surfaces. For example, a die with six flat, square sides may be modeled by a mesh of twelve triangles with vertices that correspond to the corners of the die. As the sides of a die are planar and each side is square, relatively few primitives are needed to model the die in three dimensional space. In contrast, the surface of the head and shoulders 100 in FIG. 1 is curved and angled, requiring hundreds or thousands of primitives to approximate the curves and angles that represent the image. While the individual triangles are visible close to the shoulder and forehead, a denser set of primitives are needed to represent the curves and indentations of the eye or ear. Each primitive shown in FIG. 1 may be characterized by spatial coordinates of the vertices that form the triangle of each primitive.

Figure 2:
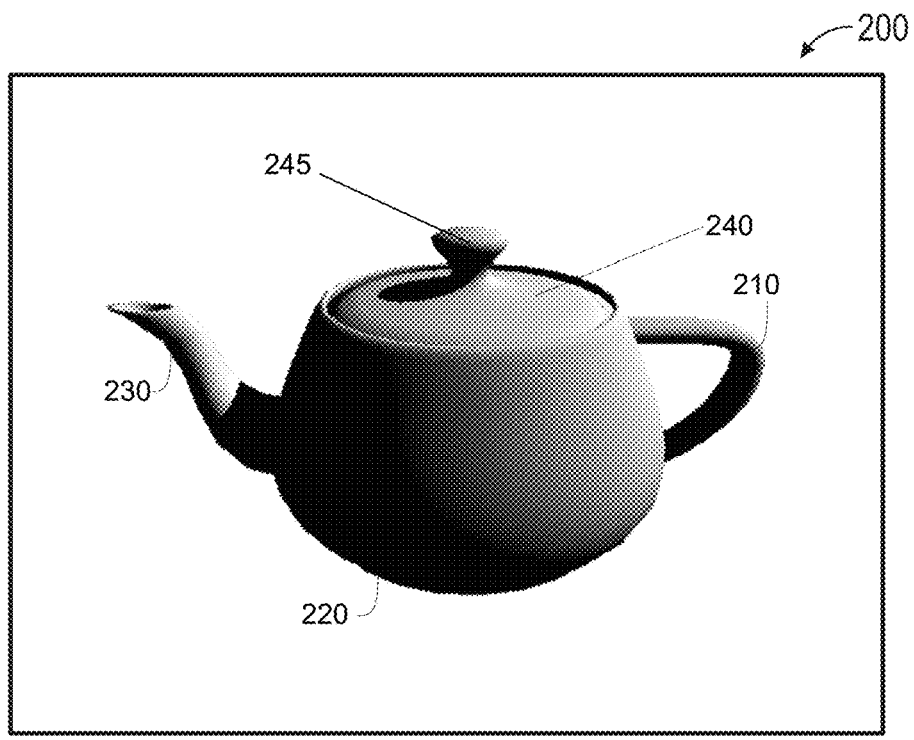
FIG. 2 illustrates a teapot rendered using computer graphics.

FIG. 2 illustrates a teapot rendered using computer graphics. The teapot 200 of FIG. 2 includes a handle 210, spout 230, top 240, top handle 245, and curved receptacle 220. Representing the teapot 200 in a computer graphics system may require hundreds or thousands of primitives to approximate a contiguous surface of the teapot, and thus enable rendering of the handle 210, spout 230, top 240, and curved receptacle 220.

Figure 3:
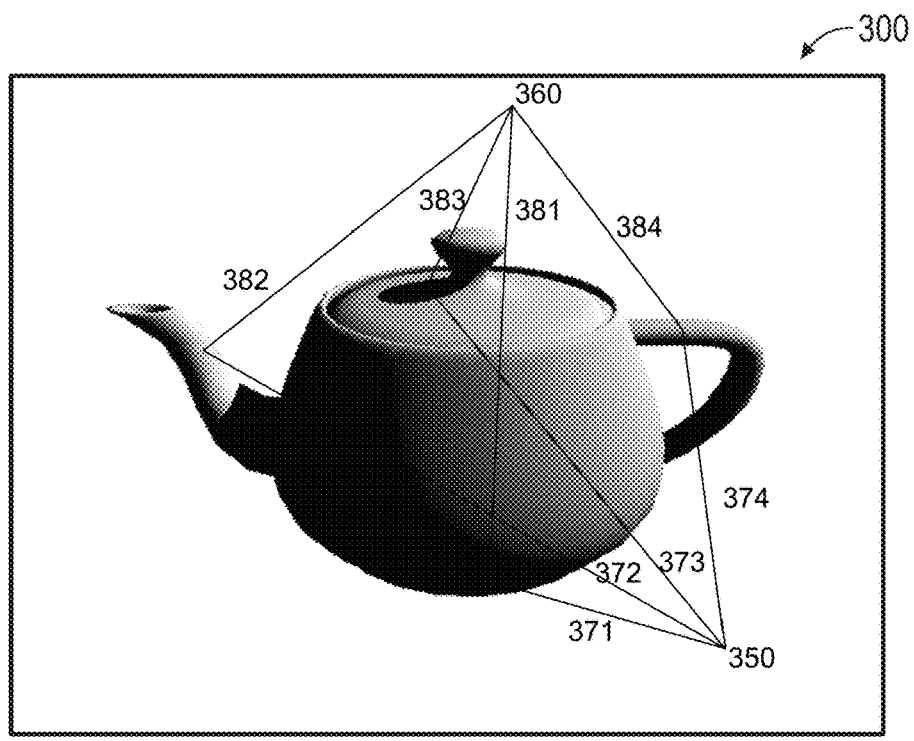
FIG. 3 illustrates the teapot of FIG. 2 modelled with ray traced primary rays and shadow rays.

FIG. 3 illustrates primary rays and shadow rays used to model the teapot of FIG. 2. Ray tracing methods use optics principles to project primary rays from a starting point, typically a viewing perspective of the scene, such as from observer 350 in FIG. 3. Each ray may intersect an image plane, and/or intersect objects (or object primitives). Primary rays originate at an observer (camera) and terminate when they intersect an object within the scene. For example, in FIG. 3, primary ray 371 originates from observer 350 and intersects a lower portion of the curved receptacle 220, ray 372 intersects the spout 230, primary ray 373 also originates from observer 350 and intersects the top 240 to the left of the top handle 245, and ray 374 originates from observer 350 and intersects the top of the handle 210.

After a primary ray intersects an object, computer graphics techniques may project a shadow ray from the point of intersection to a light source for the scene. In some cases, the light source may be shown within a digital image of the scene, or the light source may be a point not explicitly shown or represented by the digital image of the scene. In FIG. 3, shadow rays 381, 382, 383, and 384 begin at the destinations of ray 371, 372, 373, and 374, respectively and each shadow ray is directed to light source 360. A point is not in shadow if a shadow ray traced from that point toward a light source does not intersect any object between the ray origin and the light source. If there is at least one intersection, the point is in shadow. Shadow ray 381 intersects the curved receptacle 220, and therefore its origin is in a shadow as it is not directly illuminated by the light source 360. Similarly, shadow ray 383 intersects the top handle 245, and therefore its origin is not directly illuminated by light source 360. In contrast, shadow rays 382 and 384 are directly illuminated by light source 360.

Ray tracing methods may trace hundreds, thousands, or millions of rays to generate a single image. Such ray tracing methods may apply optics properties for transmission, reflection, refraction, or fluorescence, as well as aspects of surface features of objects, such as translucence and transparency, to trace each ray. Each ray, whether a primary ray, shadow ray, reflection ray, refraction ray, or other type of ray may be tested for an intersection with each primitive in a scene to determine whether the ray intersects the primitive. Ray tracing methods may model ray absorption, reflection, refraction, and fluorescence; as well as whether object surfaces are transparent or translucent. When a ray is incident to a surface, this incident ray may reflect off the surface as a reflection ray (reflected ray), and/or refract into the surface as a refraction ray (refracted ray). An object that fluoresces emits fluorescence rays, for example, when excited by ultraviolet radiation. As generating a single image my require thousands or millions of ray-object (ray-primitive) intersection tests, ray tracing may be compute intensive and slow. Special purpose hardware, such as graphic processor units (GPUs) optimized for ray tracing and scene rendering, may reduce the time it takes to trace rays for a scene and render images.

Figure 4:
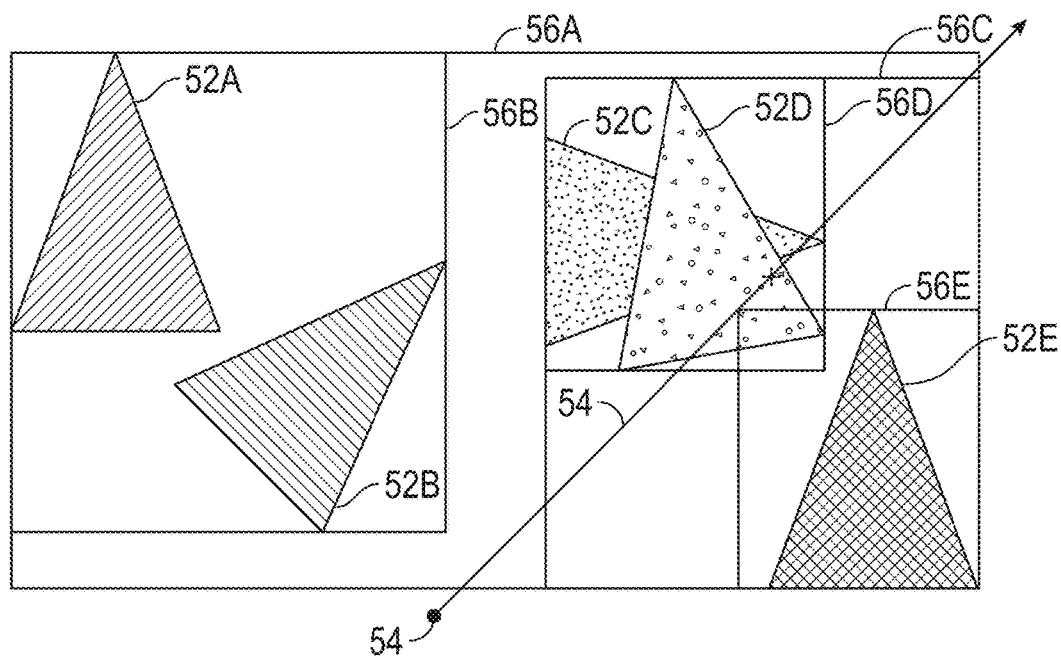
FIG. 4 illustrates bounding volumes dividing a portion of the scene of FIG. 2, the bounding volumes including primitives representing portions of surfaces in the scene.

FIG. 4 illustrates bounding volumes dividing a portion of a scene, the bounding volumes including primitives representing portions of surfaces in the scene. In some aspects, the illustrated bounding volumes may divide the scenes shown in FIG. 1 or 2A-B. FIG. 4 shows bounding volumes 56A-56E (bounding volumes 56). Bounding volumes 56 may be axis-aligned bounding boxes (AABBs), which may be bounding boxes having a minimized area or volume within which all points of the enclosed primitives may lie. Actual scenes may contain hundred, thousands, or more primitives, but for clarity five triangular primitives 52A-52E are illustrated in FIG. 4. The bounding boxes may be axis-aligned such that the edges of the boxes may be parallel to the coordinate axis (e.g., the x, y, and z axis). In some aspects, the bounding boxes may have the shape of a rectangular parallelepiped.

Bounding volume 56A may be a bounding box that bounds all primitives 52 of scene 100 or 200 for example. Bounding volumes 56B and 56C may be subsets of bounding volume 56A in that bounding volumes 56B and 56C bound a subset of the portion of scene 50 bound by bounding volume 56A. Bounding volume 56B may bound primitives 52A and 52B, and bounding volume 56C may bound primitives 52C, 52D, and 52E. Bounding volumes 56D and 56E may be subsets of bounding volume 56C, and may bound a subset of the portion of scene 50 bound by bounding volume 56C. Bounding volume 56D may bound primitives 52C and 52D, and bounding volume 56E may bound primitive 52E.

In the example shown in FIG. 4, the primitives 52 are partitioned into five bounding volumes 56. More or fewer than five bounding volumes 56 may be used to partition the scene. For example additional bounding volumes may be created as subsets of bounding volume 56B to individually bound primitives 52A and 52B, respectively. In some examples, CPU 6 may also be configured to partition primitives 52 into bounding volumes 56.

Figure 5:
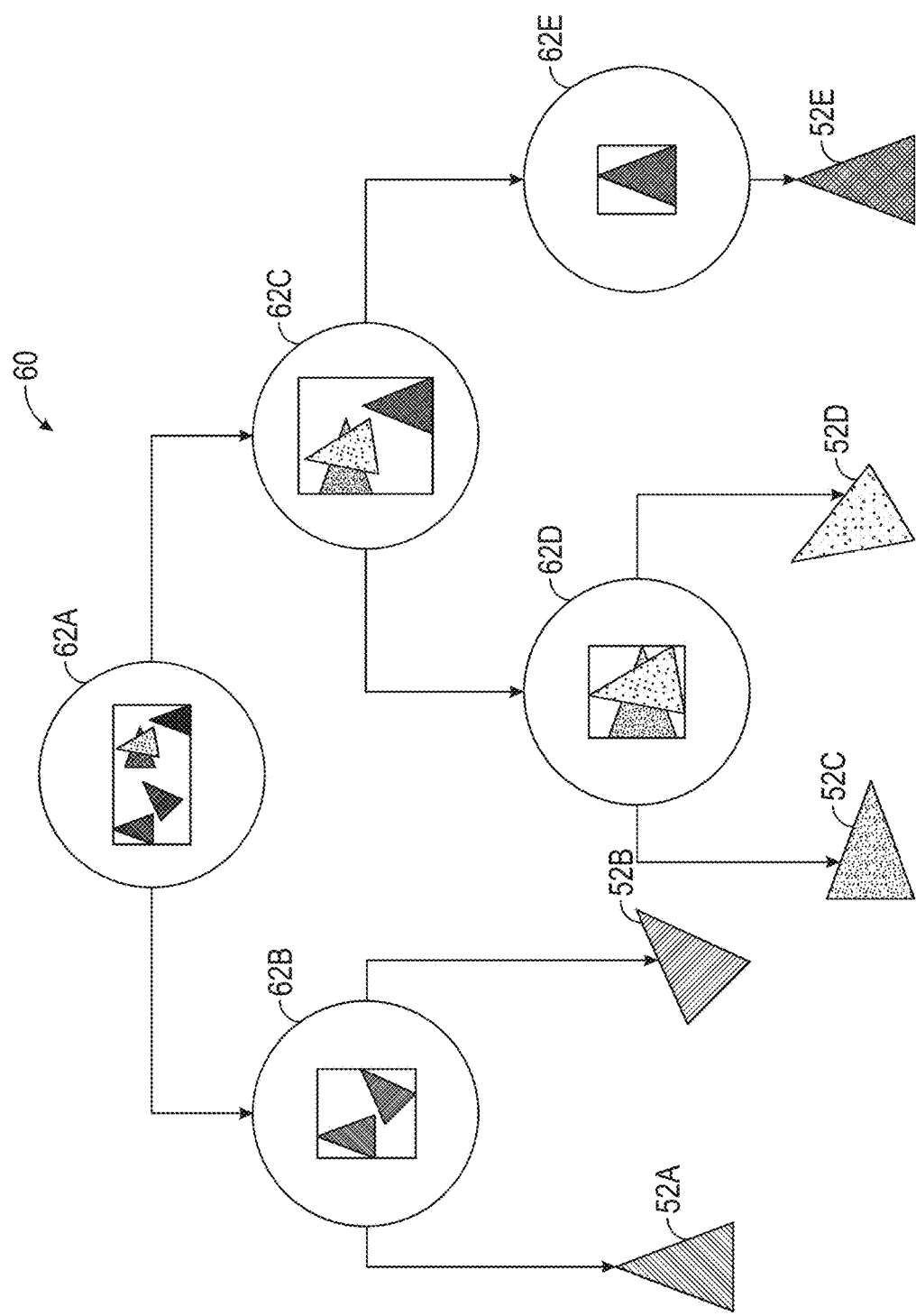
FIG. 5 illustrates a bounding volume hierarchy (BVH) organizing the bounding volumes of FIG. 4.

FIG. 5 illustrates an example hierarchical data structure 60 having nodes that are associated with the bounding volumes 56 and primitives 52 shown in FIG. 4. Acceleration hierarchical data structure 60 may be traversed to determine a ray-primitive intersection. Bounding volumes 56 and primitives 52 may be associated with nodes of bounding volume hierarchy (BVH) tree 60 that is representing one of scenes 100 or 200 for example. BVH tree 60 may include nodes 62A-62E ("nodes 62") that are associated with bounding volumes 56 and primitives 52 in scene 50. More specifically, root node 62A, interior node 62C, and leaf nodes 62B, 62D, and 62E may each be associated with a bounding volume of bounding volumes 56. Nodes of BVH tree 60 other than root node 62A may be referred to as non-root nodes of BVH tree 60. For example, interior node 62C and leaf nodes 62B, 62D, and 62E may be referred to as non-root nodes of BVH tree 60. Leaf nodes 62B, 62D, and 62E may each be linked with at least one primitive of primitives 52. For example, leaf node 62B may be linked with primitives 52A and 52B, leaf node 62D may be linked with primitives 52C and 52D, and leaf node 62E may be linked with primitive 52E. BVH tree 60 may be considered an unbalanced binary tree because each non-leaf node of hierarchical data structure 60 has at most two child nodes, and because leaf nodes 62B, 62D, and 62E may have unequal depths.

Because bounding volume 56A bounds all primitives 52 of scene 50, GPU 12 may associate root node 62A with bounding volume 56A. GPU 12 may associate nodes 62B and 62C, which are child nodes of root node 62A, with bounding volumes 56B and 56C, respectively, because bounding volumes 56B and 56C are each subsets of bounding volume 56A. GPU 12 may link primitives 52A and 52B with node 62B, because bounding volume 56B associated with node 62B bounds primitives 52A and 52B, and because there are no additional bounding volumes that are subsets of bounding volume 56B.

Bounding volumes 56D and 56E may be associated with nodes 62D and 62E, which are child nodes of node 62C, because bounding volumes 56D and 56E are each subsets of bounding volume 56C associated with node 62C. Primitives 52C and 52D may be linked with node 62D, because bounding volume 56D associated with node 62D bounds primitives 52C and 52D, and because there are no additional bounding volumes that are subsets of bounding volume 56D. Primitive 52E may be linked with node 62E, because bounding volume 56E associated with node 62E bounds primitive 52E, and because there are no additional bounding volumes that are subsets of bounding volume 56E.

The BVH tree 60 may be traversed to determine the primitive of primitives 52 that intersects ray 54 by performing ray-box intersection tests for the bounding volumes 56 associated with nodes 62 of BVH tree 60. Traversal of BVH tree 60 may start by performing a ray-box intersection test for bounding volume 56A associated with root node 62A. If ray 54 intersects bounded volume 56A, traversal may continue with node 62B by performing a ray-box intersection test for bounding volume 56B associated with node 62B. If ray 54 does not intersect bounded volume 56B, traversal may continue recursively up to node 62A and down to node 62C, and ray-box intersection test may be performed for bounding volume 56C associated with node 62C. If it is determined that ray 54 intersects bounded volume 56C, traversal may continue with node 62D, and a ray-box intersection test may be performed for bounding volume 56D associated with node 62D. If ray 54 intersects bounded volume 56D, a ray-primitive intersection test may be performed for primitives linked to node 62D. Therefore, ray-primitive intersection tests may be performed for primitive 52C and for primitive 52D. It may be determined from the ray-primitive intersection test for primitive 52D that ray 54 does intersect primitive 52D. After determining that ray 54 does intersect primitive 52D, traversal may continue recursively up to node 62C and down to 62E, and a ray-box intersection test may be performed for bounding volume 56E associated with node 62E. It may be determined, based on the ray-box intersection test, that ray 54 does not intersect bounding volume 56E, thereby ending traversal of BVH tree 60 for ray 54.

If BVH tree 60 can be traversed starting from a non-root node, such as interior node 62C or leaf nodes 62B, 62D, and 62E, the number of ray intersection tests performed in order to find all primitives intersecting the ray may be substantially less than if the traversal of BVH tree 60 starts from root node 62A. Thus, the efficiency of determining a set of primitives intersected by a ray may be improved. GPU 12 may start traversal of BVH tree 60 from a non-root node of BVH tree 60 by determining that a bounded volume associated with a non-root node of BVH tree 60 is intersected by ray 54.

FIG. 6A shows a bounding volume hierarchy (BVH) tree 610 for the teapot scene of FIGS. 2 and 3. Each node in the BVH tree is associated with a portion of the scene that occupies a volume in three dimensional space. BVH tree (hierarchy) 610 includes a root node N1, interior nodes N2-N7, and leaf nodes N8-N15. Node N1 is a parent node to nodes N2 and N3. Node N2 is a parent node to nodes N4 and N5. Node N3 is a parent node to nodes N6 and N7. Node N4 is a parent node to nodes N8 and N9. Node N5 is a parent node to nodes N10 and N11. Node N6 is a parent node to nodes N12 and N13. Node N7 is a parent node to nodes N14 and N15. While BVH tree 610 serves as an example, other bounding volume hierarchies may have hundreds, thousands, or more nodes. Each node may be uniquely identified with a label, a numeric reference, and/or a color. Other terms for parent and child are ancestor and descendent, respectively.

As an example of how BVH tree 610 may represent the teapot scenes of FIGS. 2 and 3, root node N1 may represent the entire teapot. For example, N1 may be associated with a (possibly smallest) bounding volume that encompasses the entire teapot. Node N2 may represent the teapot top 240 with top handle 245, while node N3 may represent the handle 210, vessel 220, and spout 230. The children of node N2, nodes N4 and N5, may represent the top handle 245 and teapot top 240, respectively. The children of node N3 are nodes N6 and N7. Node N6 may represent the spout 230, while node N7 may represent the handle 210 and vessel 220. Nodes N8 and N9 may represent the upper and lower portion, respectively, of the handle 245. Nodes N10 and N11 may correspond to the left and right portions, respectively, of the teapot top 240. Nodes N12 and N13 may correspond to the upper third with opening, and lower two thirds of the spout 230. Node N14 may correspond to the handle 210, while node N15 may correspond to the vessel 220. Subsequent generations of nodes would further subdivide the scene.

The root may be considered to be at the top of the hierarchy tree, with each child of the root "lower" in the hierarchy than its parent (the root). This relationship repeats for children of the root's child nodes. Accordingly, a child is at one level deeper than its parent node in the hierarchy. The root node is an ancestor to all nodes in the hierarchy (except itself). A deepest common ancestor of two or more nodes is a node with a deepest depth that is still an ancestor of each of the two or more nodes.

The children of a node are each associated with a portion of the scene represented by the parent. For example, if a root is associated with a teapot, its first child may be associated with the spout of the teapot as well as the portion of the curved receptacle in front of the top of the teapot. The second child may be associated with the remainder of the teapot, including the top, the rear portion of the curved receptacle, and the handle of the teapot. Subsequent generations may further divide the teapot, until reaching leaf nodes that may occupy a primitive of the mesh of the surface of the teapot.

As irregularly shaped volumes may require more complex calculations to, for example, determine if a ray passes through the volume, calculations may be simplified using bounding volumes that bound regular shapes. For example, a rectangular parallelepiped may bound the teapot top or the spout of the teapot. In some embodiments, axis aligned parallelepipeds may be associated with each node. Since each child in the hierarchy is a subdivision of their parent, subsequent generations of nodes tend to be associated with smaller portions of the scene and bounding volumes tend to decrease in size at each lower level of the hierarchy.

Each node N1-N15 of BVH tree 610, or nodes 62A-E of BVH tree 60 in FIG. 5, is associated with a volume in a three dimensional space of the scene being represented by the BVH tree 610 or BVH tree 60. For example, a volume associated with a parent node N1 encompasses space represented by a volume associated with any child N2 and N3 of the parent node. Thus, parent and child associated volumes may overlap. The root node's volume overlaps with all other volumes. A surface area hierarchy algorithm (SAH) or other method may be used to generate the BVH tree 610, and associate a volume with each node. Each volume may be an axis aligned bounding box, shaped like a rectangular parallelepiped, to speed computation.

In some aspects, the BVH tree 610 may be built recursively, starting with the root node N1 and an associated volume encompassing the entire scene being represented. The volume may then be divided into two or more additional volumes encompassed by the first volume, and child nodes of the root note associated with these new volumes. Each of these new additional volumes may then be further divided to create additional new volumes, with additional new nodes added as child nodes of the root's children. This process may continue until a termination condition is reached. In some aspects, the termination condition may relate to a minimum space represented by any one volume. In some aspects, a hierarchy representing a scene may have many levels, including for example, tens, hundreds, or thousands of levels.

FIG. 6B shows a set of voxels or volume elements 620 which may subdivide a scene, such as scenes 100 or 200 of FIG. 1 or 2 respectively. The example voxels 620 of FIG. 6B include eight voxels V111, V121, V211, V221, V112, V122, V212, and V222, seven (7) of which are directly visible in FIG. 6B.

Just as a rasterized image plane may be divided into pixels (square regions like boxes on graph paper), a scene may be voxelized by subdividing it into volume elements (voxels). The voxels may be cubic volume elements that adjoin in three dimensions, just as boxes on graph paper adjoin in two dimensions; voxel may be a cube with axis aligned sides. Neighboring voxels may adjoin without overlapping. A space may be divided, for example, into $16^3$ (16×16×16), $32^3$, $64^3$, $128^3$, or some other number of voxels for each of the three dimensions of the space. The number of voxels for each of the three dimensions need not be equal. With more voxels, it is possible to more finely divide the space, but at the cost of increased computational load.

A volume defined by a voxel may contain one or more scene object surface primitives. Each primitive may also be within one or more bounding volumes associated with at least one node in the BVH tree 610, including a deepest node (in some cases, a leaf node) that includes the primitive.

FIG. 6C shows an example association of voxels of FIG. 6B (identified on the left) to the nodes of FIG. 6A (identified on the right). The associations between voxels and nodes are based in part on whether scene object surface primitives within a particular voxel are within a bounding volume associated with a node. In particular, at least some of the voxels shown in FIG. 6B may encompass one or more primitives, representing objects in the scene. One or more nodes within the BVH tree 610 may represent bounding volumes also encompassing primitives encompassed by a particular voxel. The deepest common ancestor of the one or more nodes may be associated with the particular voxel in the data structure of FIG. 6C.

Said another way, if all of the object surface primitives within a voxel are within the bounding volume of a single leaf node, then that leaf node is the deepest common ancestor associated with the voxel in FIG. 6C. If the object surface primitives within a voxel do not fall within a bounding volume of a single leaf node, then a deepest common ancestor of the deepest nodes that include the primitives is the node associated with the voxel in FIG. 6C.

To demonstrate the associations between voxels and nodes in FIG. 6C, the following examples are provided. To start, voxel V111 includes scene object surface primitives within the bounding volumes associated with nodes N8 and N10. The least common ancestor of nodes N8 and N10 is N2. Therefore, the starting node for ray intersection tests for voxel V111 is node N2. Therefore, voxel V111 may be labeled or colored with the label or color corresponding to interior node N2, as shown in FIG. 6C.

Furthermore, in the example of FIG. 6A-C, voxel V112 includes scene object surface primitives within the bounding volumes associated with nodes N8 and N11. The least common ancestor of nodes N8 and N11 is N2 (the same least common ancestor as voxel V111). Therefore, the starting node for ray intersection tests for voxel V112 is node N2. Therefore, voxel V112 may be labeled or colored with the label or color corresponding to interior node N2, as shown in FIG. 6C.

Furthermore, in the example of FIG. 6A-C, voxel V211 includes scene object surface primitives within the bounding volumes associated with nodes N12 and N13. The least common ancestor of nodes N12 and N13 is node N6. Therefore, the starting node for ray intersection tests for voxel V211 is node N6. Therefore, voxel V211 may be labeled or colored with the label or color corresponding to interior node N6, as shown in FIG. 6C.

Furthermore, in the example of FIG. 6A-C, voxel V222 includes scene object surface primitives within the bounding volumes associated with nodes N9, N6, and N15. The least common ancestor of nodes N9, N6, and N15 is root node N1. Therefore, the starting node for ray intersection tests for voxel V222 is node N1. Therefore, voxel V222 may be labeled or colored with the label or color corresponding to root node N1, as shown in FIG. 6C.

Finally, in the example of FIG. 6A-C, voxel V212 does not include any scene object surface primitives; therefore, voxel V212 may be labeled with a "null" or other indicator that there are no scene object surface primitives within the voxel V212, as shown in FIG. 6C.

Some implementations may associate voxels with only a portion of a hierarchy. For example, in some aspects, voxels may be associated only with nodes in a hierarchy to a depth of 1, 2, 3, 4, 5, 6, 7, 8, 9, 10 or more levels. By voxelizing only to a certain depth, an association is made between each voxel and at least one of the nodes at the maximum voxelized level or a shallower level of the hierarchy. The lowest or deepest common ancestors discussed above will be selected from the voxelized levels of the hierarchy.

The data structures 610, 620, and 630 of FIG. 6A-6C may be used to generate a three-dimensional texture map, which associates each voxel with a "color" corresponding to the node mapped to that voxel. For example, nodes N1-N15 may each be assigned a color, and each voxel V111, V121, V211, V221, V112, V122, V212, and V222 may then be colored with the corresponding node. An additional color may be assigned to voxels that do not encompass any primitives (and are thus not mapped to any nodes in the BVH tree 610).

If primitives encompassed by a voxel are also encompassed by multiple bounding boxes (associated with multiple nodes of the BVH tree), the color associated with that voxel is set to the color associated with a deepest common ancestor of all nodes associated with the bounding volumes that encompass primitives also included within the voxel.

A first deepest common ancestor is determined during voxelization to make sure that each voxel is associated with a single color value. A second deepest common ancestor is also determined when tracing a ray to determine the deepest common ancestor of all nodes through which the ray passes.

Starting nodes for ray intersection tests may be based on the "map" of labeled (or colored) voxels of FIG. 6C. Relying on a precomputed mapping as shown in FIG. 6C may allow multiple ray tracing operations to be performed without re-computing the lowest common ancestor for each voxel with each trace operation.

To conduct ray surface intersection tests, each ray, whether a primary ray, shadow ray, reflection ray, or other type of ray is first traced from its point of origin through one or more voxels to its destination, as discussed above with respect to FIG. 3. Each voxel through which the ray passes has a corresponding texture color, as discussed above with respect to FIG. 6C. The set of texture colors for voxels through which the ray passes may then be determined based on a data structure similar to that discussed above with respect to FIG. 6C. If the ray passes through n voxels, m<=n texture colors may be identified.

Since the texture color for a voxel defines the deepest common ancestor for that particular voxel, in at least some disclosed aspects, a start node for ray intersection tests for the ray may be based on the texture colors m. For example, a deepest common ancestor of the nodes corresponding to the texture colors may be a start node for the ray intersection tests.

Figure 7:
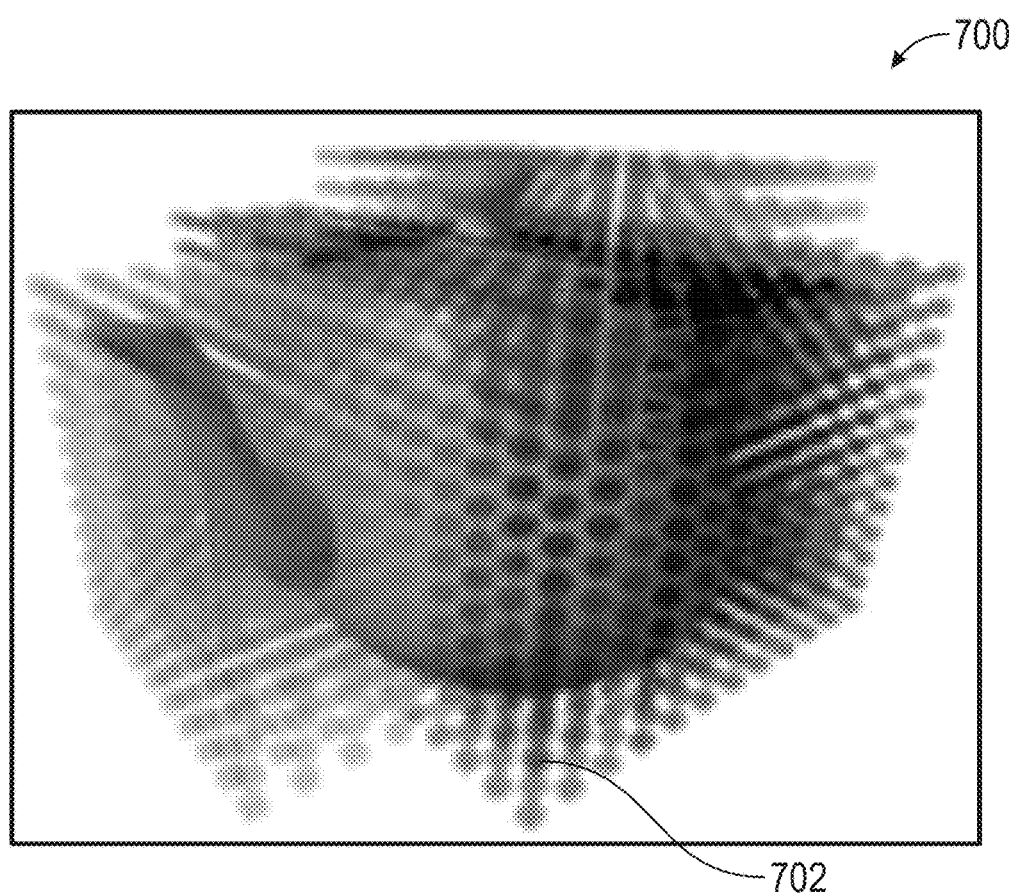
FIG. 7 is a voxelized teapot scene.

FIG. 7 is a voxelized teapot scene. Just as squares on a sheet of graph paper delimit two dimensional areas that touch but do not overlap, in three dimensions, cubic volume elements (voxels for example voxel 702) delimit volumes that touch but do not overlap. The voxels may be aligned with axes. Just as an object drawn on a piece of graph paper in two dimensions may intersect and/or fully contain one or more squares, in three dimensions, an object such as a bounding volume associated with a node in a hierarchy may intersect and/or fully contain one or more voxels. Therefore, each bounding volume associated with a node may occupy part of a single voxel, parts of multiple voxels, and/or one or more entire voxels. Each voxel, therefore, may delimit space (and be associated with) the bounding volume associated with one or more nodes in the bounding volume hierarchy.

Accordingly, in an embodiment, each voxel (for example the voxel 702), occupies a cubic region in three dimensional space, with neighboring voxels contiguous (touching) but not overlapping. Reference axes of a scene including the teapot may be aligned with the three dimensions of the voxels.

A portion of voxels segmenting a scene may represent three dimensional space that is also occupied by an object within the scene. For example, one portion of voxels in a scene may form the shape of a pyramid or cube. A pyramid in three dimensions may project to a triangle on a two dimensional image plane. In graphics processing, a small, usually indivisible building block may be a primitive for representing an object in a scene. Each primitive may have location and orientation attributes in three dimensional space, as well as characteristics such as color. Objects may be represented as combinations of primitives. Therefore, a solid model of a three dimensional representation of a scene may be formed using voxels.

Each voxel is then mapped, or associated with, bounding volumes in the hierarchy that either intersect or wholly contain each voxel, and their associated nodes. This mapping supports tracing individual rays.

Each voxel through which the ray passes is identified. The lowest common ancestor of the nodes associated with the identified voxels is identified, and used as the starting point for traversing the hierarchical tree. As this starting point may be below the hierarch, only a subset of the tree is traversed. This reduces the number of ray-primitive intersection tests and speeds ray tracing when compared to implementations that begin the traversal from the hierarch.

Figure 8:
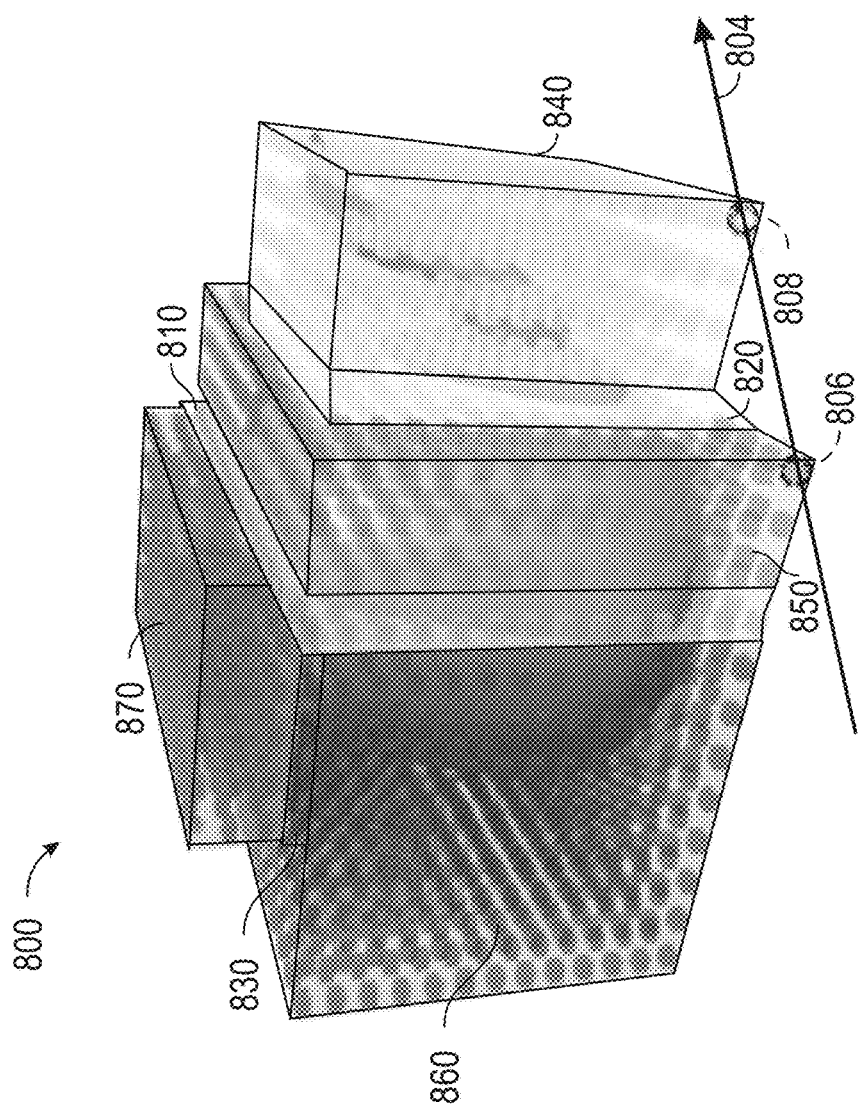
FIG. 8 illustrates a teapot scene that is segmented by both axis aligned bounding boxes and voxels. A ray is also shown intersecting two of the voxels.

FIG. 8 illustrates a teapot scene 800 including voxelized bounding volumes. FIG. 8 also illustrates a ray 804 traversing two voxels 806 and 808. Each voxel may encompass a three dimensional space, or a cube with axis aligned sides. Neighboring voxels may adjoin without overlapping. Because the scene is being represented in three dimensions, the scene may be segmented, for example, by $16^3$ (16×16×16) voxels, when a side of each voxel represents $\frac{1}{16}^{th}$ of a scene dimension, $32^3$, $64^3$, $128^3$, or some other number of voxels. The number of voxels for each of the three dimensions need not be equal. For example, when the scene is not a perfect cube but has at least one dimension that is longer than another dimension, the number of voxels in each dimension may vary. With more voxels per unit of space, it is possible to more finely divide the scene. This may increase the computational load of processing the voxels, but provide more precise definition of a ray path through the scene when selecting a lowest common ancestor as discussed below.

Figure 9:
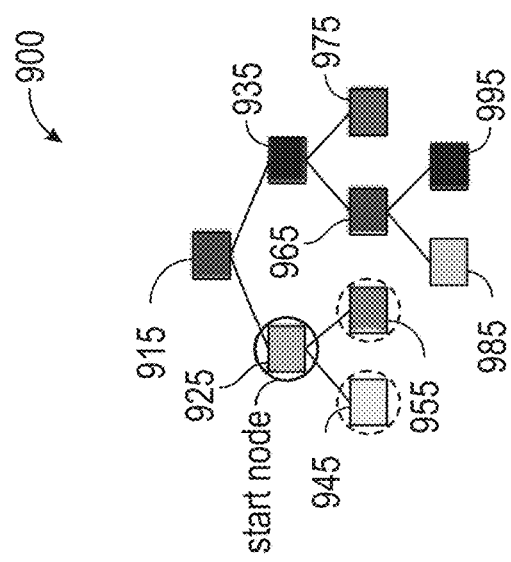
FIG. 9 illustrates a hierarchy for the scene in FIG. 8.

FIG. 9 illustrates a hierarchical data structure 900 that may be generated to represent the scene 800. The entire scene 800 corresponds to root node 915, as the root node 915 represents the entire volume of the scene 800. The root node 915 has child node 925 that includes the right portion of the scene, including the spout and front portion of the teapot, and child node 935, which represents the left portion of the scene, including the handle, top, and rear portion of the teapot. Node 925 has child node 945 which is also a leaf node, associated with bounding volume 840. Bounding volume 840 includes the spout of the teapot. Node 925 also has child node 955 that is associated with bounding volume 850. Bounding volume 850 encompasses the three dimensional space including the front portion of the teapot near the spout. The region 820 includes points in the three dimensional space that are not exclusively in bounding volume 840 or bounding volume 850, but are within the bounding volume associated with node 925, analogous to the area in FIG. 10 associated with node C. Node 935 has child node 975 with bounding volume 870 that corresponds to the top of the teapot. Node 935 has child node 965 with bounding volume 860 that corresponds to the handle and portion of the teapot away from the spout or top of the teapot. Node 965 has two child nodes, 985 and 995, that correspond to two leaf nodes with bounding volumes that are not visible. The region 830 includes points in the three dimensional space that are not exclusively in bounding volume 860 or bounding volume 870. Points in the three dimensional space that are not exclusively in either child node 925 or 935 but are within scene 800, are labeled 810, corresponding to hierarch 915.

Note that while FIG. 8 shows voxel 806 encompassed by bounding volume 850 and voxel 808 completely encompassed by bounding volume 840, in some aspects, a voxel may not be completely encompassed by a volume. In some aspects, one or more voxels may span one or more bounding volumes.

FIG. 8 demonstrates mappings between voxels and nodes. Since voxel 806 is within volume 850, which is associated with leaf node 955, voxel 806 maps to node 955. Similarly, voxel 808 maps to leaf node 945 since it is within volume 840, which is associated with leaf node 945. A voxel that spans more than one bounding volume maps to the lowest common ancestor in the hierarchy of the voxels that it spans. For example, if a voxel spans volumes 840 associated with node 845, and volume 850 associated with node 955, the that voxel is mapped to the lowest common ancestor of nodes 945 and 955, it maps to node 925, the lowest common ancestor of nodes 945 and 955. This lowest common ancestor may be used by a ray tracing operation, discussed below, which determines that a ray passes through the particular voxel.

In order to determine the starting node in the hierarchy 900, the disclosed methods and systems determine a common ancestor for the nodes with volumes that ray 804 passes through. Because ray 804 passes through bounding volumes 840 and 850, any tracing of ray 804 through the hierarchical data structure 900 must include nodes representing at least these volumes. This corresponds to nodes 945 and 955, respectively. Since the ray 804 does not pass through bounding volume 860, there is no need to include, for example, node 965, which represents bounding volume 860.

Therefore, the method determines a starting node for the traversal that is the deepest (lowest) common ancestor node of nodes representing volumes through which the ray passes. In the example of FIG. 9, node 915 is also a common ancestor to nodes 945 and 955, but node 925 is the starting (start) node because it is deeper (at a lower level in the hierarchy) than node 915. Accordingly, the method begins traversing the hierarchy at start node 925, and continues to nodes descending from start node 925 when tracing ray 804.

Once objects intersecting the ray 804 are identified via the ray intersection tests, a digital image of the scene 800 may be updated based on intersections identified from the traversal. The updated digital image may then be output to an output device, such as an electronic display, computer network, or stable storage such as a disk or other stable memory.

FIG. 10 is an example algorithmic method for BVH voxelization. This exemplary voxelization algorithm consists of two stages. In the first stage, all AABBs at a pre-determined tree depth are voxelized. In the second stage, multiple passes of voxelization follow.

FIG. 11 is an example algorithmic method to find a lowest common ancestor. This method takes two one-based (root node having index 1) 32-bit breadth-first BVH node indices on input and returns their lowest common ancestor. The example algorithm works by first moving the node lower in the tree up until both nodes are on the same tree level. Then the method ascends the tree simultaneously from both nodes upward until their paths meet in a common ancestor.

Figure 12:
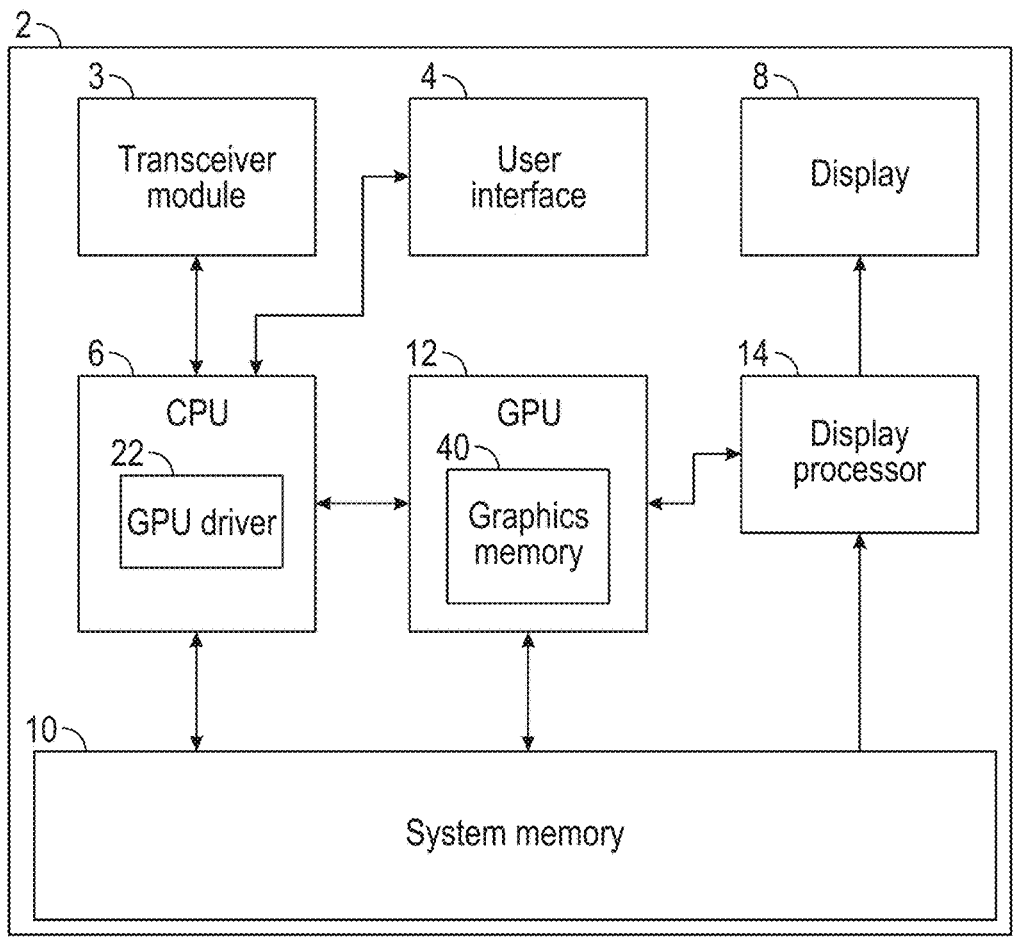
FIG. 12 is a block diagram illustrating an example computing device that may be configured to implement one or more aspects of this disclosure.

FIG. 12 is a block diagram illustrating an example computing device that may be configured to implement one or more aspects of this disclosure. As shown in FIG. 12, device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In the example of FIG. 12, device 2 may include central processing unit (CPU) 6, system memory 10, and GPU 12. Device 2 may also include display processor 14, transceiver module 3, user interface 4, and display 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Device 2 may include additional modules or units not shown in FIG. 12 for purposes of clarity. For example, device 2 may include a speaker and a microphone, neither of which are shown in FIG. 12, to effectuate telephonic communications in examples where device 2 is a mobile wireless telephone or a speaker where device 2 is a media player. Device 2 may also include a video camera. Furthermore, the various modules and units shown in device 2 may not be necessary in every example of device 2. For example, user interface 4 and display 8 may be external to device 2 in examples where device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver module 3 may include circuitry to allow wireless or wired communication between device 2 and another device or a network. Transceiver module 3 may include modulators, demodulators, amplifiers and other such circuitry for wired or wireless communication.

CPU 6 may be a microprocessor, such as a central processing unit (CPU) configured to process instructions of a computer program for execution. CPU 6 may comprise a general-purpose or a special-purpose processor that controls operation of device 2. A user may provide input to device 2 to cause CPU 6 to execute one or more software applications. The software applications that execute on CPU 6 may include, for example, an operating system, a word processor application, an email application, a spreadsheet application, a media player application, a video game application, a graphical user interface application or another program. Additionally, CPU 6 may execute GPU driver 22 for controlling the operation of GPU 12. The user may provide input to device 2 via one or more input devices (not shown) such as a keyboard, a mouse, a microphone, a touch pad or another input device that is coupled to device 2 via user interface 4.

The software applications that execute on CPU 6 may include one or more graphics rendering instructions that instruct CPU 6 to cause the rendering of graphics data to display 8. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display 8. Thus, when one of the software applications executing on CPU 6 requires graphics processing, CPU 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two dimensional (2D) and/or three dimensional (3D) graphics scenes) onto display 8 more quickly than drawing the scenes directly to display 8 using CPU 6.

GPU 12 may, in some instances, be integrated into a motherboard of device 2. In other instances, GPU 12 may be present on a graphics card that is installed in a port in the motherboard of device 2 or may be otherwise incorporated within a peripheral device configured to interoperate with device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

GPU 12 may be directly coupled to graphics memory 40. Thus, GPU 12 may read data from and write data to graphics memory 40 without using a bus. In other words, GPU 12 may process data locally using a local storage, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and output values that cause the pixels of display 8 to illuminate to display the image. Display 8 may be the display of device 2 that displays the image content generated by GPU 12. Display 8 may be a liquid crystal display (LCD), an organic light emitting diode display (OLED), a cathode ray tube (CRT) display, a plasma display, or another type of display device.

In accordance with aspects of the present disclosure, GPU 12 may organize a plurality of primitives in a hierarchical data structure. GPU 12 may rasterize or voxelize one or more bounding volumes associated with nodes of the hierarchical data structure to an off-screen render target. GPU 12 may determine interior non-root node of the hierarchical data structure as a start node in the hierarchical data structure to start traversal of the hierarchical data structure. GPU 12 may traverse the hierarchical data structure starting from the start node to determine the primitive that is intersected by the ray.

Figure 13:
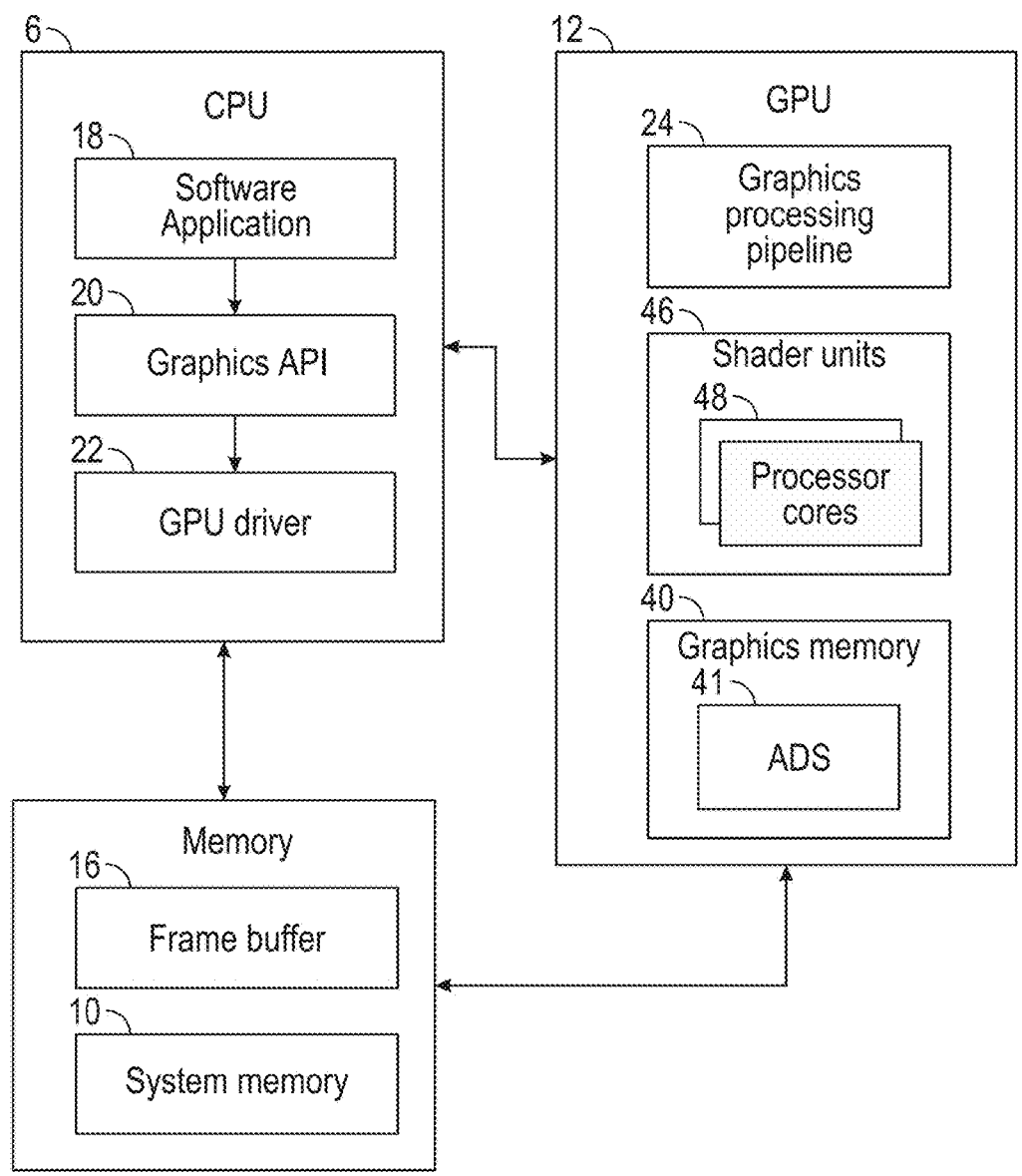
FIG. 13 is a block diagram illustrating example implementations of the CPU, the GPU, and the system memory of FIG. 12 in further detail.

FIG. 13 is a block diagram illustrating example implementations of CPU 6, GPU 12, and system memory 10 of FIG. 12 in further detail. As shown in FIG. 13, CPU 6 may include at least one software application 18, graphics API 20, and GPU driver 22, each of which may be one or more software applications or services that execute on CPU 6.

Memory available to CPU 6 and GPU 12 may include system memory 10 and frame buffer 16. Frame buffer 16 may be a part of system memory 10 or may be separate from system memory 10. Frame buffer 16 may store rendered image data.

Software application 18 may be any application that utilizes the functionality of GPU 12. For example, software application 18 may be a GUI application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, via graphics API 20, to issue one or more commands to GPU 12 for rendering one or more graphics primitives into displayable graphics images. For example, software application 18 may invoke GPU driver 22, via graphics API 20, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 18 to GPU driver 22, GPU driver 22 may formulate one or more commands that specify one or more operations for GPU 12 to perform in order to render the primitive. When GPU 12 receives a command from CPU 6, graphics processing pipeline 24 decodes the command and configures graphics processing pipeline 24 to perform the operation specified in the command. For example, an input-assembler (not shown) in graphics processing pipeline 24 may read primitive data and assemble the data into primitives for use by the other graphics pipeline stages in graphics processing pipeline 24. After performing the specified operations, graphics processing pipeline 24 outputs the rendered data to frame buffer 16 associated with a display device.

Frame buffer 16 stores destination pixels for GPU 12. Each destination pixel may be associated with a unique screen pixel location. In some examples, frame buffer 16 may store color components and a destination alpha value for each destination pixel. For example, frame buffer 16 may store Red, Green, Blue, Alpha (RGBA) components for each pixel where the "RGB" components correspond to color values and the "A" component corresponds to a destination alpha value. Although frame buffer 16 and system memory 10 are illustrated as being separate memory units, in other examples, frame buffer 16 may be part of system memory 10.

In some examples, graphics processing pipeline 24 may include one or more of a vertex shader stage, a hull shader stage, a domain shader stage, a geometry shader stage, a pixel shader stage, and a compute shader stage. These stages of graphics processing pipeline 24 may be considered shader stages. These shader stages may be implemented as one or more shader programs that execute on shader units 46 in GPU 12. Shader units 46 may be configured as a programmable pipeline of processing components. In some examples, shader unit 46 may be referred to as "shader processors" or "unified shaders," and may perform geometry, vertex, pixel, or other shading operations to render graphics. Shader units 46 may include processor cores 48, each of which may include one or more components for fetching and decoding operations, one or more arithmetic logic units for carrying out arithmetic calculations, one or more memories, caches, and registers.

GPU 12 may designate shader units 46 to perform a variety of shading operations such as vertex shading, hull shading, domain shading, geometry shading, pixel shading, compute shading, and the like by sending commands to shader units 46 to execute one or more of a vertex shader stage, a hull shader stage, a domain shader stage, a geometry shader stage, and a pixel shader stage in graphics processing pipeline 24. In some examples, GPU driver 22 may be configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), or a C for Graphics (Cg) shading language. The compiled shader programs may include one or more instructions that control the operation of shader units 46 within GPU 12. For example, the shader programs may include vertex shader programs that may be executed by shader units 46 to perform the functions of a vertex shader stage, hull shader programs that may be executed by shader units 46 to perform the functions of a hull shader stage, domain shader programs that may be executed by shader units 46 to perform the functions of a domain shader stage, geometry shader programs that may be executed by shader units 46 to perform the functions of a geometry shader stage, and/or pixel shader programs that may be executed by shader units 46 to perform the functions of a pixel shader, and/or compute shader programs that may be executed by shader units 46 to perform the functions of a compute shader. A vertex shader program may control the execution of a programmable vertex shader unit or a unified shader unit, and include instructions that specify one or more per-vertex operations.

Graphics memory 40 is on-chip storage or memory that physically integrated into the integrated circuit of GPU 12. Because graphics memory 40 is on-chip, GPU 12 may be able to read values from or write values to graphics memory 40 more quickly than reading values from or writing values to system memory 10 via a system bus. Graphics memory 40 may store ADS 41 that hierarchically groups scene primitives (e.g., triangles). In some examples, ADS 41 may be stored in system memory 10, in shader memory (not shown) of shader units 46 or in shared system/graphics memory (not shown).

In accordance with aspects of the present disclosure, GPU 12 may organize a plurality of primitives in ADS 41. GPU 12 may rasterize or voxelize one or more bounding volumes associated with nodes of ADS 41 to an off-screen render target stored in graphics memory 40. GPU 12 may determine a non-root node of ADS 41 as a start node in ADS 41 to start traversal of ADS 41. GPU 12 may traverse ADS 41 starting from the start node to determine the primitive that is intersected by the ray.

Figure 14:
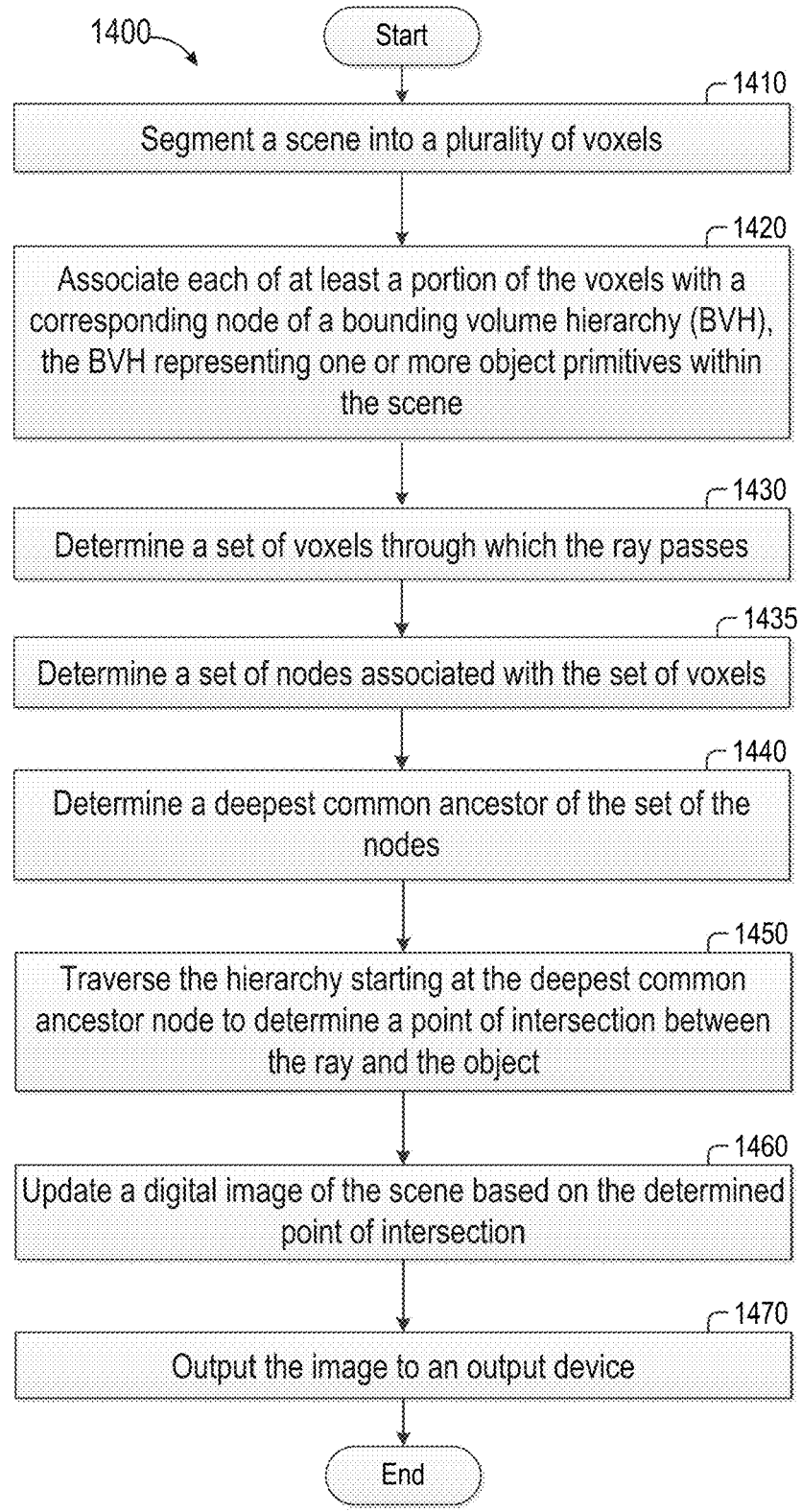
FIG. 14 is a flowchart illustrating an example method for determining a ray-object intersection.

FIG. 14 is a flowchart illustrating an example method 1400 for determining a ray-object intersection. In some aspects, method 1400 may be performed by the device 2 of FIG. 12. For example, method 1400 may be performed by one or more of the CPU 6, GPU 12, and display processor 14 in some aspects. In some aspects, method 1400 may be performed by instructions that configure one or more of the CPU 6, GPU 12, and display processor 14 to perform the functions described below. While method 1400 is described below as a series of blocks, any of the blocks described below may be optional. In particular, blocks 1460 and/or 1470 may not be performed in some aspects.

In block 1410, method 1400 segments a scene into a plurality of voxels. For example, in some aspects, the scene may be segmented as discussed above with respect to the example of FIG. 6A-C. The scene may be segmented using a variety of methods. For example, the scene may be segmented by dividing the scene into 2, 4, 6, 8, 10 or any number of equally sized portions of three dimensional space. If the three dimensional space comprising the scene has x, y, and z dimensions, each dimension may be divided by a constant to determine the length of each dimension of a voxel. Each voxel may then be defined by adjoining voxels of the determined dimensions until the entire space for the scene is encompassed by a non-overlapping voxel. This is not the only method of segmenting a scene, but is provided as an illustrative example. In an embodiment, the functionality of block 1410 may be performed by the GPU 12, in FIG. 13.

Block 1420 associates at least a portion of the voxels with a corresponding node in a bounding volume hierarchy (BVH), the BVH representing one or more object primitives within the scene. In some aspects, the voxelization performed in block 1420 may be performed in substantial conformance with that described above with respect to FIG. 10.

Some implementations associate each voxel with a corresponding node by determining a set of nodes in the hierarchy associated with bounding volumes encompassing at least a portion of (or, in some aspects, all of the) surface primitives located within the voxel, and associating the voxel with a deepest common ancestor of the set of nodes. In an embodiment, the functionality of block 1410 may be performed by the GPU 12, in FIG. 13. In some aspects, the association performed in block 1420 is as described above with respect to FIGS. 6A-C.

In some aspects, to improve search performance of the hierarchy and reduce overhead associated with identification of nodes based on voxels, an indexing data structure may be generated that stores associations between the one or more of voxels, bounding volumes, and nodes in the hierarchy. The data structure may record a deepest common ancestor node for each voxel. By performing a look up operation via the data structure, the deepest common ancestor node associated with a voxel may be efficiently identified. In an embodiment, the functionality of block 1420 may be performed by the GPU 12 of FIG. 13.

In some aspects of method 1400, blocks 1410 and/or 1420 discussed above may not be performed. For example, in some aspects, a BVH tree may be voxelized during a first portion of processing a digital image. During processing of the digital image, hundreds or thousands of ray tracing operations for primary rays, shadow rays, reflection rays, refraction rays, and/or other types of rays may be performed. The same acceleration data structure (i.e. BVH tree and/or voxelization of same) may be relied on for processing by a plurality of these ray tracing operations. Therefore, a first ray tracing operation may include blocks 1410 and 1420, while a second ray tracing operation may consult the same data structures, and therefore not perform blocks 1410 and 1420.

In block 1430, method 1400 determines a set of voxels through which the ray passes. In some aspects, the set of voxels may be determined by comparing the path of the ray in the three dimensional space of the scene to the space encompassed by each voxel in the set of voxels. If the path of the ray overlaps with the space encompassed by a particular voxel, then the ray passes through the voxel. Otherwise, the ray does not pass through the voxel.

For example, ray 804 of FIG. 8 passes through two voxels 806 and 808. Ray 804 passes through voxel 806 in bounding volume 850, and voxel 808 in bounding volume 840. As a ray may be characterized by a starting location and direction, determining the path of the ray is a straightforward application of ray optics. Once the path of the ray is known, in some aspects, voxels representing three dimensional space including the ray path may be determined to be included in the set of voxels. In an embodiment, the functionality of block 1430 may be performed by the GPU 12, in FIG. 13.

In block 1435, a set of nodes associated with the set of voxels (through which the ray passes) is determined. This determination may be based on the association made in block 1420. In some aspects, determining the set of nodes may include referencing a data structure storing the association between each voxel in the set of voxels and a node with which the voxel is associated. Each node in the set of nodes may be read from the data structure based on an identifier of the corresponding voxel. In some aspects, one or more of the functions discussed above with respect to block 1435 may be performed by the GPU 12 of FIG. 13.

Block 1440 determines a deepest common ancestor of the set of nodes determined in block 1435. In some aspects, a deepest common ancestor of a set of nodes may be found by selecting any one of the nodes in the set of nodes. After selecting the node, a test may be performed to determine if the selected node is an ancestor to all of the other nodes in the set of nodes. If the selected node is not the ancestor, the direct ancestor of the selected node may become a new selected node. A check may then be performed to determine if the new selected node is an ancestor to all of the nodes in the set of nodes. If not, the ancestor of the new selected node may become a yet second new selected node. This process may repeat until an ancestor of all the nodes is determined. In some aspects, an optimization of this process may include first identifying a node in the set of nodes that is the shallowest node in the BVH tree. This identified node may be selected first to determine if it is the ancestor of all of the other nodes in the set of nodes.

An example of a deepest common ancestor is shown with respect to FIG. 8. Ray 804 passes through two voxels. First, the ray passes through voxel 806 in bounding volume 850 of node 955 (of FIG. 9). Ray 804 also passes through voxel 808 in bounding volume 840 of node 945. Thus, in the example of FIGS. 8-9, the set of nodes is nodes 945 and 955. As discussed above with respect to block 1420, in some aspects, an indexing data structure may be provided to enable efficient identification of first start nodes associated with each voxel. If the set of nodes determined in block 1435 is an empty set, then the ray did not pass intersect any objects in the scene. In an embodiment, the functionality of block 1440 may be performed by the GPU 12, in FIG. 13.

In block 1450, method 1400 traverses the hierarchy starting at the deepest common ancestor to determine a point of intersection between the ray and the object. Traversing the hierarchy corresponds to searching the volumes associated with traversed nodes for primitives encompassed by the volumes to conduct ray-primitive intersection tests. Each ray intersection test determines whether the path of the ray intersects an object represented, at least in part, by a primitive encompassed by the volume. By starting the traversal of the hierarchy below the root node, a reduced number of nodes and therefore bounding volumes is searched. Therefore, fewer object-primitive tests are necessary to complete the trace of a ray. In some aspects, once the starting node is identified, the method 1400 traverses the portion of the hierarchy descending from the start node using a depth first traversal. In an embodiment, the functionality of block 1450 may be performed by the GPU 12, in FIG. 13.

In block 1460, some aspects may update a digital image of the scene based on ray/object intersections identified during the traversal of block 1450. For example, illumination/luminance values for an object may vary based on whether the ray intersects the object or not. For example, if the ray is a secondary ray, and it intersects a primitive before reaching a light source, the luminance value of the primitive from which the secondary ray originates may be darker than if the secondary ray does not intersect a primitive before reaching the light source. In an embodiment the functionality of block 1460 may be performed by the GPU 12, in FIG. 13.

In optional block 1470, the updated digital image or data derived from the updated digital image may then be output to an output device, such as an electronic display, electronic network such as the Internet, or to a stable storage device such as a disk drive. For example, in some aspects, block 1470 may be performed by reading a file or other memory object containing at least a portion of the updated digital image to obtain data representing the portion, and writing the data to the output device, for example, via a device driver or streams API. This read/write cycle may repeat as necessary until all of the data comprising the updated digital image has been output. For example, the writing may terminate when an end of file marker is reached. In an embodiment the functionality of block 1470 may be performed by the GPU 12, in FIG. 13. After a ray-primitive intersection is found, the result of the search includes the ID of the primitive. The ID is then used to retrieve primitive attributes (vertex attributes, such as normal, positions, etc.). The result of the search also includes the exact intersection point of the ray and the primitive, usually represented in barycentric coordinates. These are then used to interpolate vertex attributes and these are then used to calculate lighting (for example).

Some implementations may also include generating the hierarchy. Generating the hierarchy may include generating a mesh of primitives, such as triangles, to represent a three dimensional object contained within the scene. In some aspects, generating the hierarchy includes generating a plurality of leaf nodes. Each leaf node may represent a corresponding bounded volume bounding at least one primitive. Generating the hierarchy may also include generating a plurality of interior nodes. Each interior node may be a direct ancestor to at least one other node in the hierarchy. Each interior node may represent a bounded volume that includes a volume represented by each node descending from the interior node. A hierarch is an ancestor to all the nodes of the hierarchy, except the hierarch itself of course. As the hierarch is an ancestor to all other nodes, the hierarch also represents the first volume, which includes bounded volumes represented by all of the other nodes of the hierarchy. In some aspects, each interior node is a direct ancestor to no more than two nodes. In some aspects, each bounded volume represents a three dimensional axis aligned bounding box within the first volume.

In some aspects, generating the hierarchy may also include assigning each node to a depth level of the hierarchy. The hierarch may be at the shallowest depth level, while at least one leaf node defines the deepest depth level of the hierarchy. In some aspects, the hierarchy may be generated as described above with respect to FIGS. 12 and 13.

FIG. 15 illustrates voxelization results for shadow rays, including teapot shadows, head reflections, fruit bowl ambient occlusions (AO), scene from the computer game Sponza ambient occlusions, and sphere reflections. Each image in FIG. 15 is a rendered scene.

FIG. 16 lists BVH voxelization results for shadow rays for the scenes illustrated in FIG. 15 including results for each of the scenes at baseline (starting from the root node, without using the disclosed technology), and using bounded volume hierarchies of depths 1, 2, 6, 10, and 15.

Example results were measured on a commodity laptop computer, running an Intel Core i5-2540M CPU and an NVIDIA GeForce 4200M GPU using a ray tracer running on the GPU. The ray tracer is built on top of the DirectX 11 API. It uses vertex and pixel shaders for BVH rasterization and compute shaders for BVH traversal. The exemplary voxelization code runs on the CPU of the laptop computer.

The numbers $16^3$ and $32^3$ correspond to the resolution of the voxel grid. For example, $16^3$ correspond to a voxel grid containing $16 \times 16 \times 16 = 4096$ voxels. Similarly, $32^3$ correspond to a voxel grid containing $32 \times 32 \times 32 = 32,768$ voxels. For example, the fruit bowl scene with $16^3$ voxels, at a depth of 10, has an 11.2% reduction in the number of ray/AABB intersection tests, to 353 million. The same fruit bowl scene with $32^3$ voxels, at a depth of 10, has a 19.1% reduction in the number of ray/AABB intersection tests, to 321 million. This improved reduction comes at a cost in the time it takes for BVH voxelization. At a depth of 10, BVH voxelization time increases from 2.69 ms to 6.20 ms with the increase in the number of voxels from $16^3$ to $32^3$. Table 2 shows that increasing depth, as well as increasing voxel resolution, may result in a further reduction in the number of ray/AAB intersection tests. These improvements may come at a cost of increased voxelization time. The optimal voxel resolution and depth may vary with different scenes.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner.

Also, unless stated otherwise a set of elements may comprise one or more elements. In addition, terminology of the form "at least one of: A, B, or C" used in the description or the claims means "A or B or C or any combination of these elements." As an example, "at least one of: a, b, or c" is intended to cover: a, b, c, a-b, a-c, b-c, and a-b-c.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

The various illustrative logical blocks, modules and circuits described in connection with the present disclosure may be implemented or performed with a general purpose processor, a graphics processor unit (GPU), a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein.

The systems and methods described herein may be implemented on a variety of different computing devices. They may use general purpose or special purpose computing system environments or configurations. Examples of computing systems, environments, and/or configurations that may be suitable for use with the invention include, but are not limited to, personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. The functions described may be implemented in hardware, software, firmware or any combination thereof. If implemented in software, the functions may be stored as one or more instructions on a computer-readable medium.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

It is to be understood that the claims are not limited to the precise configuration and components illustrated above. Various modifications, changes and variations may be made in the arrangement, operation and details of the methods and apparatus described above without departing from the scope of the claims.

What is claimed:

1. A method of ray tracing in an electronic image of a scene, comprising:
    segmenting the scene into a plurality of voxels;
    associating each of the voxels with a node of a bounding volume hierarchy (BVH) representing one or more object primitives within the scene;
    for a single ray in the ray tracing, determining a set of voxels through which the ray passes;
    determining a set of nodes associated with the set of voxels through which the single ray passes;
    determining a first deepest common ancestor node of the set of nodes;
    traversing the hierarchy starting at the first deepest common ancestor node to determine a point of intersection between the single ray and one of the one or more object primitives; and
    updating a digital image of the scene based on the determined point of intersection.

2. The method of claim 1, further comprising outputting the updated digital image to an output device.

3. The method of claim 1, wherein associating each voxel with a node comprises:
    determining a smallest set of bounding volumes for each voxel encompassing primitives also included in the space represented by the voxel;
    determining nodes in the hierarchy associated with the set of bounding volumes;
    determining a second deepest common ancestor of the determined nodes; and
    associating the voxel with the second deepest common ancestor.

4. The method of claim 3, further comprising selecting the smallest set of bounding volumes from bounding volumes at a level of the bounding volume hierarchy that is below a threshold.

5. The method of claim 1, wherein traversing the hierarchy comprises performing a depth first traversal of the hierarchy starting with the first deepest common ancestor.

6. The method of claim 1, further comprising:
    storing an identification of each voxel and its associated node in a data structure; and
    determining a plurality of first deepest common ancestors for a corresponding plurality of rays based on the data structure.

7. The method of claim 1, wherein the ray is a shadow ray following a path from a surface of one of the one or more object primitives toward a light source in the scene.

8. The method of claim 7, wherein the surface point is also a point of intersection of a second ray, the path of the shadow ray independent of an origin of the second ray.

9. An apparatus for ray tracing in an electronic image of a scene, comprising:
    a memory circuit configured to store a representation of a scene; and a processor circuit in communication with the memory unit configured to:
  segment the scene into a plurality of voxels;
  associate each of the voxels with a node of a bounding volume hierarchy (BVH) representing one or more object primitives within the scene;
  for a single ray in the ray tracing, determine a set of voxels through which the ray passes;
  determine a set of nodes associated with the set of voxels through which the single ray passes;
  determine a first deepest common ancestor node of the set of nodes;
  traverse the hierarchy starting at the first deepest common ancestor node to determine a point of intersection between the single ray and one of the one or more object primitives; and
  update a digital image of the scene based on the determined point of intersection.

10. The apparatus of claim 9, wherein the processor circuit is further configured to output the updated digital image to an output device.

11. The apparatus of claim 9, wherein associate each voxel with a node comprises:
  determine a smallest set of bounding volumes for each voxel encompassing all primitives also included in the space represented by the voxel;
  determine nodes in the hierarchy associated with the set of bounding volumes;
  determine a second deepest common ancestor of the determined nodes; and
  associate the voxel with the second deepest common ancestor.

12. The apparatus of claim 11, wherein the processor circuit is further configured to select the smallest set of bounding volumes from bounding volumes at a level of the bounding volume hierarchy below a threshold.

13. The apparatus of claim 9, wherein traverse the hierarchy comprises perform a depth first traversal of the hierarchy starting with the first deepest common ancestor.

14. The apparatus of claim 9, wherein the processor circuit is further configured to:
  store an identification of each voxel and its associated node in a data structure; and
  determine a plurality of first deepest common ancestors for a corresponding plurality of rays based on the data structure.

15. The apparatus of claim 9, wherein the ray is a shadow ray following a path from a surface point of one of the one or more object primitives toward a light source in the scene.

16. The apparatus of claim 9, wherein the surface point corresponds to the point of intersection of a second ray, the path of the shadow ray independent of an origin of the second ray.

17. An apparatus for ray tracing in an electronic image of a scene, comprising:
  means for segmenting the scene into a plurality of voxels;
  means for associating each of the voxels with a node of a bounding volume hierarchy (BVH) representing one or more object primitives within the scene;
  means for determining a set of voxels through which a single ray in the ray tracing passes;
  means for determining a set of nodes associated with the set of voxels through which the single ray passes;
  means for determining a first deepest common ancestor node of the set of nodes;
  means for traversing the hierarchy starting at the first deepest common ancestor node to determine a point of intersection between the single ray and one of the one or more object primitives; and
  means for updating a digital image of the scene based on the determined point of intersection.

18. The apparatus of claim 17, wherein the segmenting means comprises a processing circuit, wherein the associating means comprises the processing circuit, wherein the set of voxel determining means comprises the processing circuit, wherein the set of nodes determining means comprises the processing circuit, wherein the first deepest common ancestor determining means comprises the processing circuit, wherein the hierarchy determining means comprises the processing circuit, wherein the traversing means comprises the processing circuit, and wherein the updating means comprises the processing circuit.

19. The apparatus of claim 17, further comprising means for outputting the updated digital image to an output device.

20. The apparatus of claim 19, further comprising means for selecting the smallest set of bounding volumes from bounding volumes at a level of the bounding volume hierarchy below a threshold.

21. The apparatus of claim 17, wherein the associating means comprises:
  means for determining a smallest set of bounding volumes for each voxel encompassing all primitives also included in the space represented by the voxel;
  means for determining nodes in the hierarchy associated with the set of bounding volumes;
  means for determining a second deepest common ancestor of the determined nodes; and
  means for associating the voxel with the second deepest common ancestor.

22. The apparatus of claim 17, wherein the traversing means comprises means for performing a depth first traversal of the hierarchy starting with the first deepest common ancestor.

23. The apparatus of claim 17, further comprising:
  means for storing an identification of each voxel and its associated node in a data structure; and
  means for determining a plurality of first deepest common ancestors for a corresponding plurality of rays based on the data structure.

24. The apparatus of claim 17, wherein the ray is a shadow ray following a path from a surface point toward a light source in the scene, the surface point on one of the one or more object primitives.

25. The apparatus of claim 17, wherein the surface point corresponds to the point of intersection of a second ray, the path of the shadow ray independent of an origin of the second ray.

26. A non-transitory computer-readable medium storing instructions that when executed cause an electronic hardware processor to perform a method for ray tracing in an electronic image of a scene, the method comprising:
  segmenting the scene into a plurality of voxels;
  associating each of the voxels with a node of a bounding volume hierarchy (BVH) representing one or more object primitives within the scene;
  for a single ray in the ray tracing, determining a set of voxels through which the ray passes;
  determining a set of nodes associated with the set of voxels through which the single ray passes;
  determining a first deepest common ancestor node of the set of nodes;

traversing the hierarchy starting at the first deepest common ancestor node to determine a point of intersection between the single ray and one of the one or more object primitives; and updating a digital image of the scene based on the determined point of intersection.

27. The non-transitory computer-readable medium of claim 26, the method further comprising outputting the updated digital image to an output device.

28. The non-transitory computer-readable medium of claim 26, wherein associating each voxel with a node comprises:

determining a smallest set of bounding volumes for each voxel encompassing all primitives also included in the space represented by the voxel;

determining nodes in the hierarchy associated with the set of bounding volumes;

determining a second deepest common ancestor of the determined nodes; and associating the voxel with the second deepest common ancestor.

29. The non-transitory computer-readable medium of claim 26, wherein traversing the hierarchy comprises performing a depth first traversal of the hierarchy starting with the first deepest common ancestor.

30. The non-transitory computer-readable medium of claim 26, the method further comprising:

selecting the smallest set of bounding volumes from bounding volumes at a level of the bounding volume hierarchy below a threshold.

* * * * *